United States Patent
Sannohe et al.

[11] Patent Number: 5,946,054
[45] Date of Patent: Aug. 31, 1999

[54] OPTICAL APPARATUS, PROJECTION DISPLAY APPARATUS AND OPTICAL COMPENSATION METHOD

[75] Inventors: Shinya Sannohe; Yoshito Miyatake, both of Neyagawa, Japan

[73] Assignee: Matsushita Electric Industrial Co., Ltd., Osaka, Japan

[21] Appl. No.: 08/709,283

[22] Filed: Sep. 6, 1996

[30] Foreign Application Priority Data

Sep. 7, 1995 [JP] Japan .................................. 7-229820

[51] Int. Cl.⁶ ...................................................... H04N 9/31
[52] U.S. Cl. ................................ 348/745; 359/487; 349/8
[58] Field of Search .................................... 348/745, 756, 348/757, 779, 786; 349/8, 9; 359/487; H04N 9/31, 5/74

[56] References Cited

U.S. PATENT DOCUMENTS

| | | |
|---|---|---|
| 4,836,649 | 6/1989 | Ledebuhr et al. . |
| 4,850,685 | 8/1988 | Kamakura et al. .................... 350/397 |
| 5,231,431 | 11/1990 | Yano et al. ............................. 353/31 |
| 5,264,879 | 1/1991 | Shikama ..................................... 349/9 |
| 5,530,489 | 10/1994 | Henderson et al. .................... 348/757 |

FOREIGN PATENT DOCUMENTS

| | | |
|---|---|---|
| 418947 | 3/1991 | European Pat. Off. . |
| 602732 | 6/1994 | European Pat. Off. . |
| 7-13103 | 1/1995 | Japan . |
| WO94/23540 | 10/1994 | WIPO . |

OTHER PUBLICATIONS

*Patent Abstracts of Japan*, vol. 16, No. 433 (p. 1418), Sep. 10, 1992 and JP 04 149426A (Canon Inc.), May 22, 1992, Category X.

*Patent Abstracts of Japan*, vol. 17, No. 448 (p. 1594), Aug. 17, 1993 and JP 05 100187 A (Hitachi Ltd.), Apr. 23, 1993, Category X.

*Primary Examiner*—David E. Harvey
*Attorney, Agent, or Firm*—Beveridge, DeGrandi, Weilacher & Young, LLP

[57] ABSTRACT

In the optical apparatus, the projection lens has a first lens group and a second lens group, the color synthesizing optical system has a transparent plate, dichroic mirrors and a plane mirror, the second lens group is disposed between the color synthesizing optical system and the polarization beam splitters, and the plane including the normal line of the plane of the transparent plate, the color synthesizing planes of the dichroic mirrors and the optical axis of the projection lens is perpendicular to the plane including the normal line of the polarizing and splitting planes of the polarization beam splitters and the optical axis of the projection lens.

28 Claims, 13 Drawing Sheets

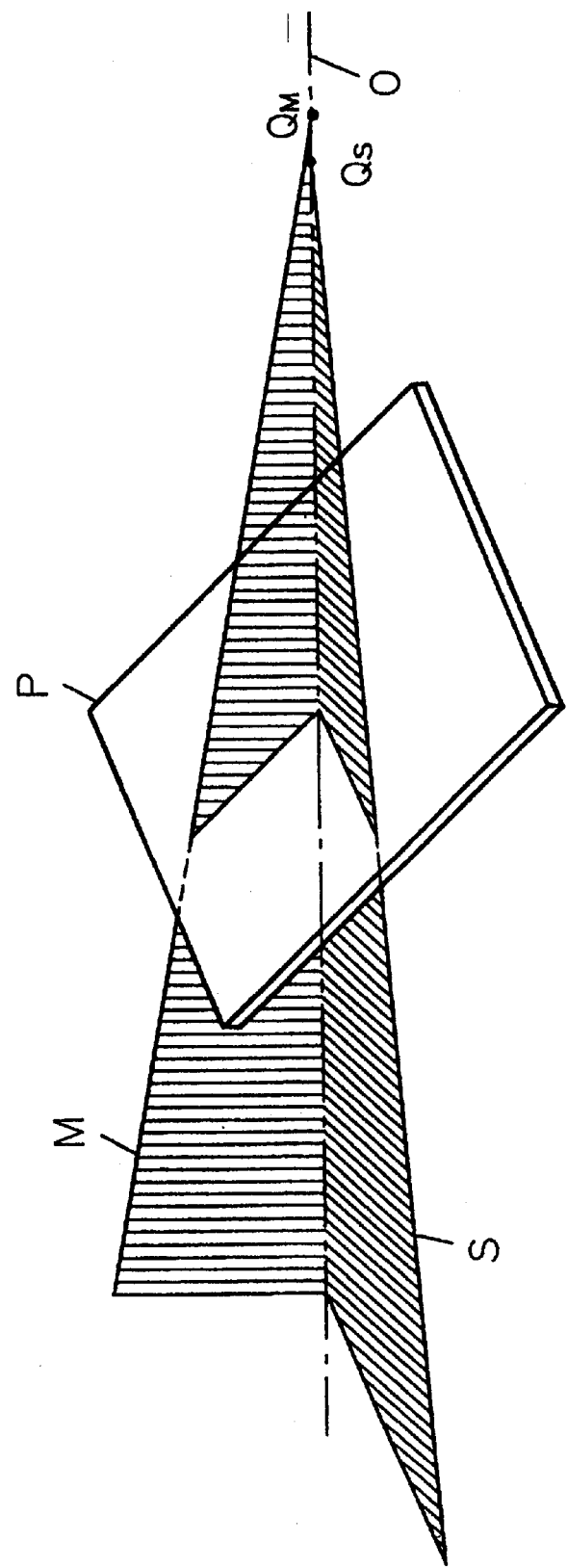

OPTICAL APPARATUS, PROJECTION DISPLAY APPARATUS AND OPTICAL COMPENSATION METHOD

BACKGROUND OF THE INVENTION

1. Field of the Invention

The present invention relates to a projection display apparatus for magnifying and projecting optical images formed on light valves, and to an optical apparatus using the projection display apparatus.

2. Related Art of the Invention

A method for forming optical images on light valves depending on picture signals, for applying light to the optical images, and for magnifying and projecting the optical images on a screen via a projection lens is known as a method for obtaining large screen images. These days, attention is given to a projection display apparatus using a liquid crystal display as a light valve.

In addition, a method for using a reflecting light valve capable of increasing pixels without reducing the pixel aperture ratio of a liquid crystal panel has been proposed in U.S. Pat. No. 4,836,649 by Ledebuhr et al. to increase the resolution of projected images. Since it is not necessary to dispose a switching element between pixel electrodes in the case of the reflecting light valve, the pixel pitch can be made smaller, and a high density structure can be attained easily. Consequently, the brightness of the reflection type is higher than the transmission type, whereby projected images having high resolution can be obtained.

The basic structure of the reflecting light valve and its operation principle are described be low referring to FIG. 1. A photoconductive layer 3, an optically reflecting layer 4 and a liquid crystal layer 5 used as an optically modulating layer are disposed between two transparent electrodes 2, 6 formed on two glass substrates 1, 7. Voltage is applied across the two transparent electrodes 2, 6. Light 8 to be written from an image source enters the photoconductive layer 3 from the glass substrate 1. On the other hand, light 9 to be read enters the liquid crystal layer 5 from the glass substrate 7. The applied voltage changes depending on the image to be written formed on the photoconductive layer 3, whereby the light 9 to be read is modulated. The modulated light 9 to be read is reflected by the optically reflecting layer 4 and projected on a screen (not shown) as a projected image. A highly dielectric liquid crystal, a nematic liquid crystal or the like can be used as a material of the optically modulating layer. FIG. 2 shows a structure of a projection display apparatus using three reflecting light valves for red, green and blue colors, which is used to obtain a projected full-color image having high luminance and high resolution. Light comprising nearly parallel light beams enters a cold mirror 12 for transmitting ultraviolet radiation and infrared radiation and for reflecting visible light, and the light is separated into three primary color bands (green, blue and red light components) by a color separating optical system comprising dichroic mirrors 13, 14 and a plane mirror 15. The three primary color bands enter polarization beam splitters 19, 20, 21 corresponding to the color bands via plane mirrors 16, 17 and 18, respectively, and the color bands are each separated into an S-polarized light component which is reflected and a P-polarized light component which is transmitted. The S-polarized light components enter reflecting light valves 22, 23, 24 corresponding thereto as light components to be read. The reflecting light valves 22, 23, 24 are used to modulate the light components to be read using the double refraction characteristics of liquid crystals, and have such a structure as that shown in FIG. 1. The images of light components to be written from image sources 25, 26, 27, such as CRTs, are formed on photoconductive layers of the reflecting light valves 22, 23, 24 by writing lenses 28, 29, 30, respectively. The double refraction characteristics of the liquid crystal layers are changed by the voltages applied depending on the written images. In other words, when a linearly polarized light component having a predetermined polarizing direction enters as a light component to be read, the reflected light becomes elliptically polarized light. Therefore, parts of the S-polarized light components are converted into P-polarized light components by the reflecting light valves 22, 23, 24, and reenter the polarization beam splitters 19, 20, 21. The P-polarized light components included in the reflected light pass through the polarization beam splitters 19, 20, 21, and are synthesized into a single component by a color synthesizing optical system comprising dichroic mirrors 31, 32 and a plane mirror 33. The component enters a projection lens 34. The S-polarized light components are reflected by the polarization beam splitters 19, 20, 21 and travel toward the light source 11. In this way, the optical images formed depending on the changes in the double refraction characteristics of the liquid crystal layers of the reflecting light valves 22, 23, 24 are magnified and projected on a screen (not shown).

In the structure shown in FIG. 2, a single projection lens, namely, the projection lens 34, is used. This structure is more advantageous than that including three projection lenses in the convergence adjustment and color uniformity of projected images and the compactness of the apparatus. However, this structure requires a color synthesizing optical system to synthesize reflected light components from the three light valves into a single light beam. The color synthesizing planes of the dichroic mirrors 31, 32 to be used in this case are inclined with respect to the optical axis of the projection lens 34. When inclined parallel plane plates (dichroic mirrors) having a specific thickness are disposed in the optical path of the image-forming optical system, astigmatism occurs, thereby significantly deteriorating the resolution of projected images.

It is conceivable that the following two methods are used to reduce or eliminate astigmatism generated at the dichroic mirrors 31, 32.

a) The substrates of the dichroic mirrors are made thinner.
b) Dichroic prisms which do not generate astigmatism are used.

Since the color synthesizing optical system is disposed between the light valves and the projection lens, the system must be considered as part of the projecting optical system. In this case, in particular, the reflecting planes of the dichroic mirrors are required to have high plane accuracy. It is difficult to attain high accuracy as the substrate is made thinner. Particularly when high-precision projected images, such as images for high-definition TV, are displayed, the substrate must have a thickness of at least 1.5 mm or more to satisfy the plane accuracy required for the reflecting planes of the dichroic mirrors. For this reason, the method of a) has a limit, and it is thus difficult to reduce the adverse effect of astigmatism on the resolution.

The method b) is carried out in two approaches: one approach wherein a color synthesizing plane is formed on the junction plane of two glass prisms used as dichroic prisms, and the other approach wherein a liquid having the same refractive index as that of the substrate of the dichroic mirror is filled in a transparent container including a dichroic mirror so as to function as a prism as a whole. However, the former approach requires high cost and causes heavy weight.

The latter approach requires a very long optical path for the liquid in the color synthesizing optical path, whereby the focus drift of projected images due to the change in refractive index depending on temperature becomes not negligible. Because of these reasons, it is difficult to adopt these approaches.

SUMMARY OF THE INVENTION

Accordingly, the object of the present invention is to provide an optical apparatus capable of solving the above-mentioned problems and properly compensating for astigmatism generated at a color synthesizing optical system, and to provide a projection display apparatus capable of displaying high-dissolution projected images by using the optical apparatus.

An optical apparatus of the present invention comprises:
image forming means for forming optical images;
second lens means for transmitting light from said image forming means;
plane plate members for transmitting and/or reflecting light from said second lens means; and
first lens means for receiving light from said plane plate members and delivering processed light, wherein
said plane plate members are disposed obliquely with respect to the optical axes of said first lens means, and
the magnitude of the astigmatism generated depending on said plane plate members is smaller than the magnitude generated when said second lens means are not used.

An optical apparatus of the present invention comprises:
image forming means for forming optical images;
polarizing and splitting means having a polarizing and selecting characteristic so as to reflect said first polarized light component and transmit said second polarized light component, said first and second polarized light components being perpendicular to each other;
plane plate members for transmitting and/or reflecting light; and
a lens means for receiving light from said plane plate members and delivering processed light, in this sequence, wherein
said plane plate members are disposed obliquely with respect to an optical axis of said lens means,
said polarizing and splitting means are equipped with transparent substrate having a predetermined thickness, also having a film with said polarizing and selecting characteristic and disposed obliquely with respect to the optical axis of said lens means,
the plane including a normal line to said transmitting and/or reflecting plane of said plane plate members and an optical axis of said lens means is perpendicular to a plane including a normal line to said film-formed plane of said transparent substrate and the optical axis of said lens means.

An optical compensation method for an optical apparatus of the present invention comprises:
image forming means for forming optical images;
second lens means for transmitting light from said image forming means;
plane plate members for transmitting and/or reflecting light from said second lens means; and
first lens means for receiving light from said plane plate members and delivering processed light, said plane plate members being disposed obliquely with respect to an optical axes of said first lens means, wherein
said first lens means receive light from said plane plate members and project said optical images, said second lens means is disposed between said plane plate member and said image forming means,
a magnification of said second lens is adjusted so that a magnitude of an astigmatism generated depending on said plane plate members is smaller than the magnitude generated when said second lens means are not used.

An optical compensation method for an optical apparatus of the present invention comprises:
image forming means for forming optical images;
polarizing and splitting means having a predetermined thickness and transmitting or reflecting light depending on the polarized light component,
plane plate members having a predetermined thickness and transmitting and/or reflecting light,
a lens means for receiving light from said plane plate members and delivering processed light, in this sequence, said plane plate member being disposed obliquely with respect to an optical axis of said lens means, wherein
a plane including a normal line to said plane plate members and the optical axis of said lens means is perpendicular to a plane including a normal line to said polarizing and splitting means and the optical axis of said lens means,
a relationship between a thickness of said plane plate member and a thickness of said transparent substrate is adjusted so that an astigmatism generated at said plane plate member and an astigmatism generated at said polarizing and splitting means can be compensated for with each other.

An optical apparatus of the present invention comprises:
a plurality of image forming means for forming optical images depending on the change in double refraction;
polarizing and splitting means provided at each of said image forming means and for splitting polarized light components whose polarized wave planes are perpendicular to each other;
second lens provided at each of said polarizing and splitting means and for transmitting light from the polarizing and splitting means;
color synthesizing means for synthesizing light beams from each one of said polarizing and splitting means into a single light beam; and
the first lens for receiving light from said color synthesizing means and delivering processed light, in this sequence, wherein
said polarizing and splitting means have a transparent substrate having parallel planes and disposed obliquely with respect to an optical axis of said first lens, and a dielectric multilayer film having a polarizing and selecting characteristic is formed on the transparent substrate,
said color synthesizing means comprise a plurality of dichroic mirrors which are respectively made by forming a dielectric multilayer film having a wavelength selection characteristic on a transparent substrate having parallel planes and disposed obliquely with respect to the optical axis of said first lens,
a plane including a normal line of a dielectric multilayer film formation plane of each one of said dichroic mirrors and an optical axes of said first and/or second lens is perpendicular to a plane including a normal line of a dielectric multilayer formation plane of said polarizing and splitting means and the optical axes of said first and/or second lens.

A projection display apparatus of the present invention comprises:
a light source delivering light including the three primary color components;
color separating means for separating the light from said light source to the three primary color components;

three prepolarizers for receiving each one of three output light beams from said color separating means, respectively;

polarized beam splitter, disposed at each of said prepolarizers, respectively, for transmitting or reflecting light beams from said prepolarizer;

reflecting light valve, disposed at each of said polarized beam splitters, respectively, for forming optical images on the basis of light beams from a predetermined image source and an optical writing means;

color synthesizing means for synthesizing light beams from said polarization beam splitters into a single light beam;

second lens disposed between said polarized beam splitter and said color synthesizing means so as to correspond to said polarized beam splitter; and a first lens for receiving light from said color synthesizing means and delivering processed light, wherein said image source generates image light beams to be applied so as to correspond to said reflecting light valve, said light writing means form the images of said image light beams from said image source on said reflecting light valve, each one of said polarization beam splitters have polarizing and splitting mirror with a dielectric multilayer film having a polarizing and selecting characteristic, and formed on the transparent substrate thereof having parallel planes, said each one of polarizing light beam splitters is disposed between said reflecting light valve and said second lens, said color synthesizing means comprise two dichroic mirrors, an optical compensation plate, both planes of which are subjected to reflection prevention treatment, and a plane mirror, and said color synthesizing means is disposed between said first lens and said second lens, a polarizing and splitting plane of said polarizing and splitting mirror, color synthesizing planes of said two dichroic mirrors and a reflection prevention plane of said optical compensation plate are disposed obliquely with respect to an optical axis of said first lens, respectively, and a plane including a normal line of the polarizing and splitting plane of said polarizing and splitting mirror and an optical axis of said first lens and/or said second lens is perpendicular to a plane including a normal line of the color synthesizing plane of said two dichroic mirrors, a normal line of the reflection prevention plane of said optical compensation plate and the optical axis of said first lens and/or said second lens.

A projection display apparatus of the present invention comprises:

a light source delivering light including three primary color components;

color separating means for separating the light from said light source into the three primary color components;

three light valves for receiving three each one of output light beams from said color separating means, respectively;

color synthesizing means for synthesizing output light beams from said light valves into a single light beam;

a second lens disposed between said light valves and said color synthesizing means; and a first lens for receiving light from said color synthesizing means and delivering processed light, wherein said color synthesizing means comprise a first dichroic mirror, a second dichroic mirror and a plane mirror, and said second lens is disposed between said first dichroic mirror and said second dichroic mirror.

It is evident that the optical apparatus in accordance with the optical compensation method of the present invention has the following advantages; the optical apparatus can properly compensate for astigmatism generated at the color synthesizing optical system thereof, and the projecting optical system thereof can be made compact. Therefore, even when the projection display apparatus using the optical apparatus of the present invention comprises a single projection lens having a color synthesizing optical system, the projection display apparatus can display projected images having very high resolution.

The features and effects of the present invention will be apparent from the descriptions of the following embodiments by referring to the accompanying drawings.

BRIEF DESCRIPTION OF THE DRAWINGS

FIG. 3 is a schematic view illustrating astigmatism;

DESCRIPTION OF THE PREFERRED EMBODIMENTS

The embodiments of the invention will be described below referring to the accompanying drawings.

Astigmatism caused by a dichroic mirror used as a color synthesizing means occurs as described below. When convergent light passes through a transparent plate P having parallel planes and inclined with respect to the optical axis as shown in FIG. 3, it is assumed that an incident plane is defined as a plane including the normal line of the interface plane between the transparent plate P and a medium (air in this case) and the principal light beam O of the convergent light, that the light beam in a plane perpendicular to the incident plane is defined as a sagittal light beam S, and that the light beam in the plane parallel with the incident plane is defined as a meridional light M. In these assumptions, the sagittal light beam S passed through the transparent plate P intersects the principal light beam O at point $Q_S$, and the meridional light beam M passed through the transparent plate P intersects the principle light beam O at point $Q_M$. If $Q_S$ differs from $Q_M$, astigmatism occurs. The distance between point $Q_S$ and $Q_M$ is referred to as astigmatic difference.

Figure 4A:
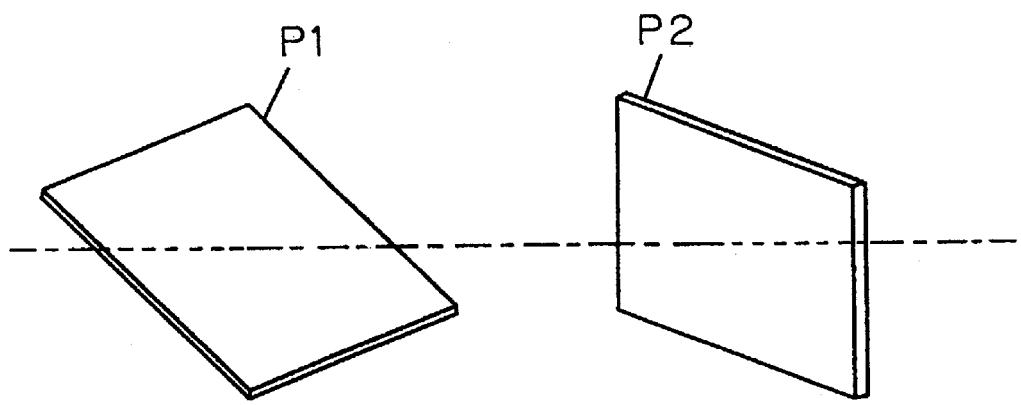
FIG. 4A is a schematic structural view illustrating an astigmatism compensation method which uses a structure comprising two transparent plates P1, P2 having parallel planes disposed so that their incident planes are perpendicular to each other.

When two transparent plates P1, P2 having parallel planes are disposed so that their incident planes are perpendicular to each other as shown in FIG. 4A, the sagittal light beam and the meridional light beam defined with respect to the transparent plates P1, P2 are replaced with each other so that the astigmatism generated at the plate P1 and the astigmatism generated at the plate P2 are canceled with each other. In case a lens system having power is not used between the transparent plates P1, P2, the astigmatism can be compensated for, provided that the inclination angle with respect to the optical axis, thickness and refractive index of the plate P1 are equal to those of the plate P2.

However, when an additional transparent plate for compensating for astigmatism is provided between a projection lens used as a projection means and a light valve used as an image forming means, in addition to the dichroic mirror used as a color synthesizing means, the projection lens is required to have a very long back focus.

Figure 4B:
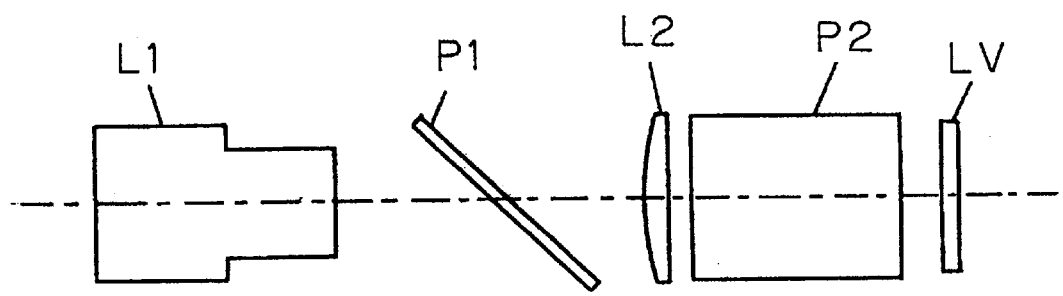
FIG. 4B is a schematic structural view illustrating an astigmatism compensation method which uses a structure comprising a first lens group L1, a transparent plate P1 having parallel planes and used as a dichroic mirror of a color synthesizing optical system, a second lens group L2, a transparent plate P2 having parallel planes and used to compensate for astigmatism generated at the transparent plate P1, and a light valve LV.

Accordingly, a structure shown in FIG. 4B is conceived, wherein the projection lens comprises a first lens group L1 having a long air space and a second lens group L2, a color synthesizing optical system is disposed between the first lens group L1 and the second lens group L2, and the transparent plate P2 having parallel planes and compensating for astigmatism generated at the transparent plate P1 having parallel planes and used as the dichroic mirror of the color synthesizing optical system is disposed between the second lens group L2 and the light valve LV. With this structure, a projection lens having a small lens diameter can be attained while achieving a substantially long back focus (distance between the first lens group L1 and the light valve LV).

In this case, since the second lens group L2 having power is disposed between the color synthesizing optical system and the transparent plate P2 compensating for astigmatism generated at the transparent plate P1 of the color synthesizing optical system, the astigmatic difference $d_1'$ generated at the color synthesizing optical system is represented by the following formula:

$$d_1' = m^2 d_1 \quad (1)$$

wherein m is the virtual image magnification of the second lens group and $d_1$ is the astigmatic difference generated at the color synthesizing optical system not provided with the second lens group L2.

Accordingly, when the astigmatic difference generated at the transparent plate P2 disposed between the second lens group L2 and the light valve LV is $d_2$, the thickness values of the transparent plate P1 and the transparent plate P2 compensating for astigmatism should be set so that the following condition can be satisfied.

$$d_1' = d_2 \quad (2)$$

Furthermore, the optical apparatus of the invention uses a polarization beam splitter as a polarizing and splitting means having functions of a polarizer and an analyzer. The polarization beam splitter is disposed between the second lens group and the image forming plane, and the transparent plate having parallel planes and used to form polarizing and splitting planes is disposed so as to compensate for the astigmatism generated at the color synthesizing optical system. With this structure, the polarization beam splitter can have both the polarizing and splitting function and the astigmatism compensation function.

As can be understood from the formula (1), the astigmatic difference $d_1'$ generated at the transparent plate P1 (dichroic mirror) of the color synthesizing optical system can be made smaller than the astigmatic difference $d_1$ generated without the second lens group L2 by the square of the virtual image magnification m of the second lens group having positive power. In this respect, a specific embodiment will be described below.

A specific embodiment of a projection display apparatus using the optical apparatus of the invention will be described below referring to a structure drawing shown as FIG. 5.

The lenses 64, 65, 66 of the second lens group in the structure are joined with the polarization beam splitters 52, 53, 54, respectively. The first lens group 71 and the second lens group 64, 65, 66 form a projection lens. The optical system from the polarization beam splitters 52, 53, 54 to the first lens group 71 is referred to as a projecting optical system for projecting the optical images on the reflecting light valves 55, 56, 57 onto a screen.

Figure 1:
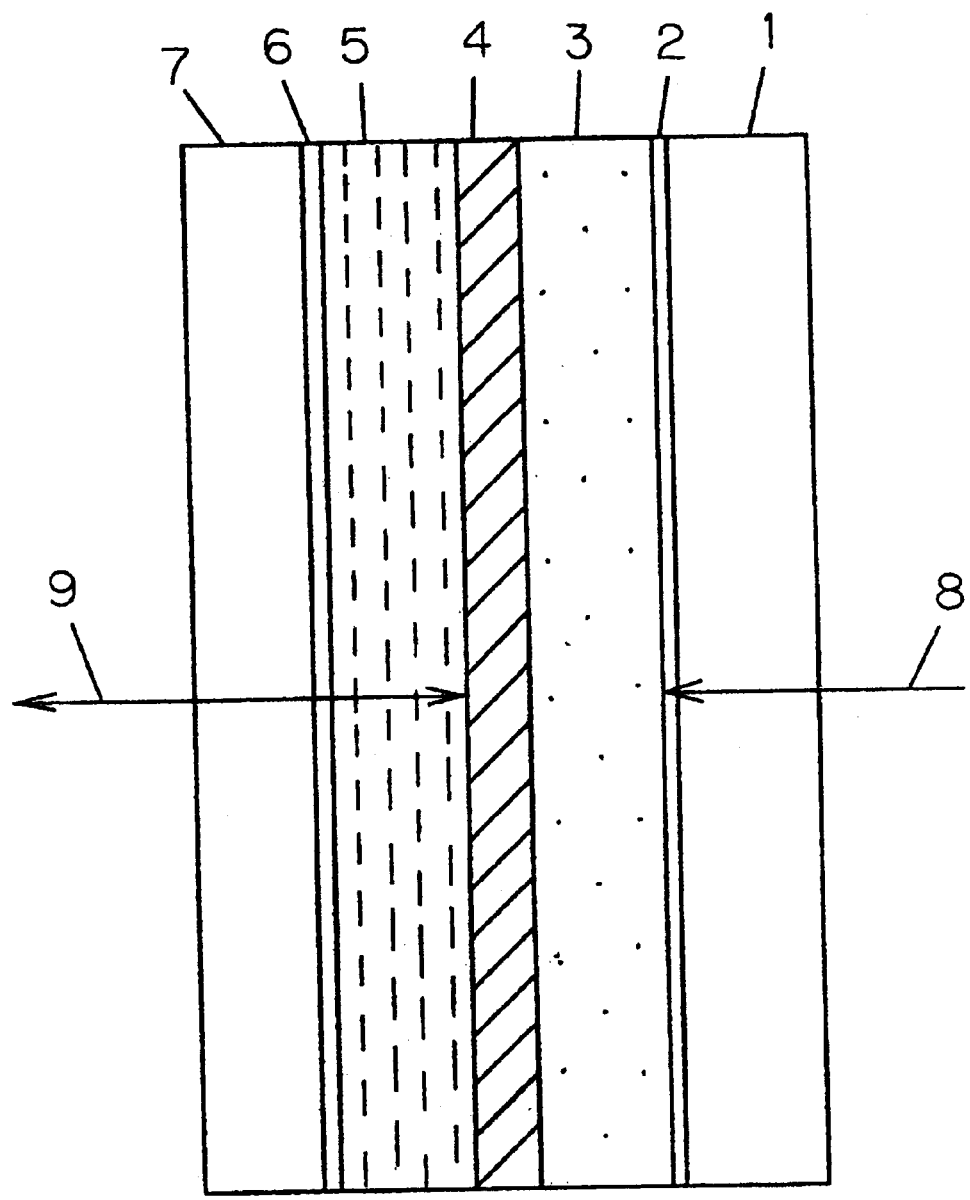
FIG. 1 is a schematic sectional view showing the basic structure of a reflecting light valve.
Figure 2:
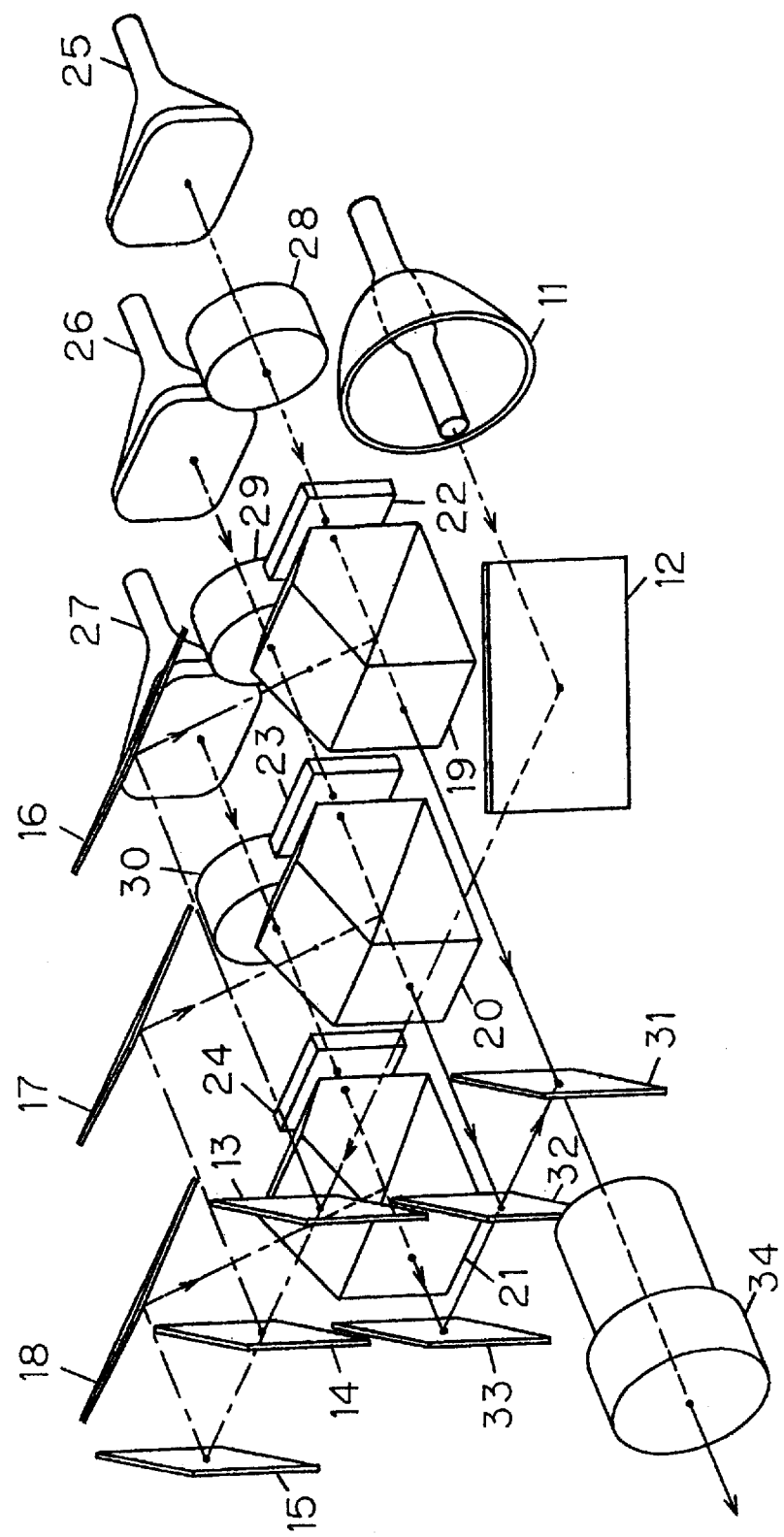
FIG. 2 is a perspective view showing an embodiment of a conventional optical apparatus.

A light source 41 emits light including the three primary color components. A cold mirror 42 reflects visible light and allows infrared light to pass through. Only the visible light of the light from the light source 41 is reflected by the cold mirror 42. The visible light is separated into three primary color components: green, blue and red components, sequentially by a color separating optical system comprising three dichroic mirrors 43, 44, 45. The primary color components enter prepolarizers 46, 47, 48, respectively, and each component goes out as a nearly linearly polarized light component. The nearly linearly polarized primary color components enter the polarization beam splitters 52, 53, 54 via mirrors 49, 50, 51, and are reflected on the sides of the reflecting light valves 55, 56, 57 as light components to be read. The reflecting light valves 55, 56, 57 have a basic structure similar to that shown in FIG. 1.

On the other hand, the images on CRTs 58, 59, 60 are formed on the photoconductive layers of the reflecting light valve 55, 56, 57 corresponding to writing lenses 61, 62, 63 as light beams to be written. Liquid crystal layers used as optical modulating layers modulate the linearly polarized light beams to be read which enter depending on the images formed on the photoconductive layers. The modulated light beams to be read are reflected by the reflecting layers of the reflecting light valves 55, 56, 57, and reenter polarization beam splitters 52, 53, 54. The reflected polarized light components travel toward the light source 41, and the transmitted polarized light components enter the second lens group comprising lenses 65, 66, 67.

The light components from the second lens group comprising lenses 65, 66, 67 are synthesized into a single beam of light by the color synthesizing optical system comprising a transparent plate 67, dichroic mirrors 68, 69 and a plane mirror 70, and the synthesized light beam enters the first lens group 71. The optical images on the three reflecting light valves 55, 56, 57 are magnified and projected on a screen positioned at a remote site by the first lens group 71 and the second lens group comprising lenses 64, 65, 66.

The transparent plate 67 is inserted so as to equalize astigmatic differences generated at the color synthesizing optical systems for the three primary color components. Consequently, the thickness values of the transparent plates of the three polarization beam splitters 52, 53, 54 can be equalized.

It is preferable that the polarization beam splitters 52, 53, 54, the second lens group comprising lenses 64, 65, 66, the transparent plate 67, the dichroic mirrors 68, 69, the mirror 70, the first lens group 71 are all accommodated in a single mirror tube. With this structure, the projecting optical system from the polarization beam splitters 52, 53, 54 to the first lens group 71 can be assembled accurately.

Figure 5:
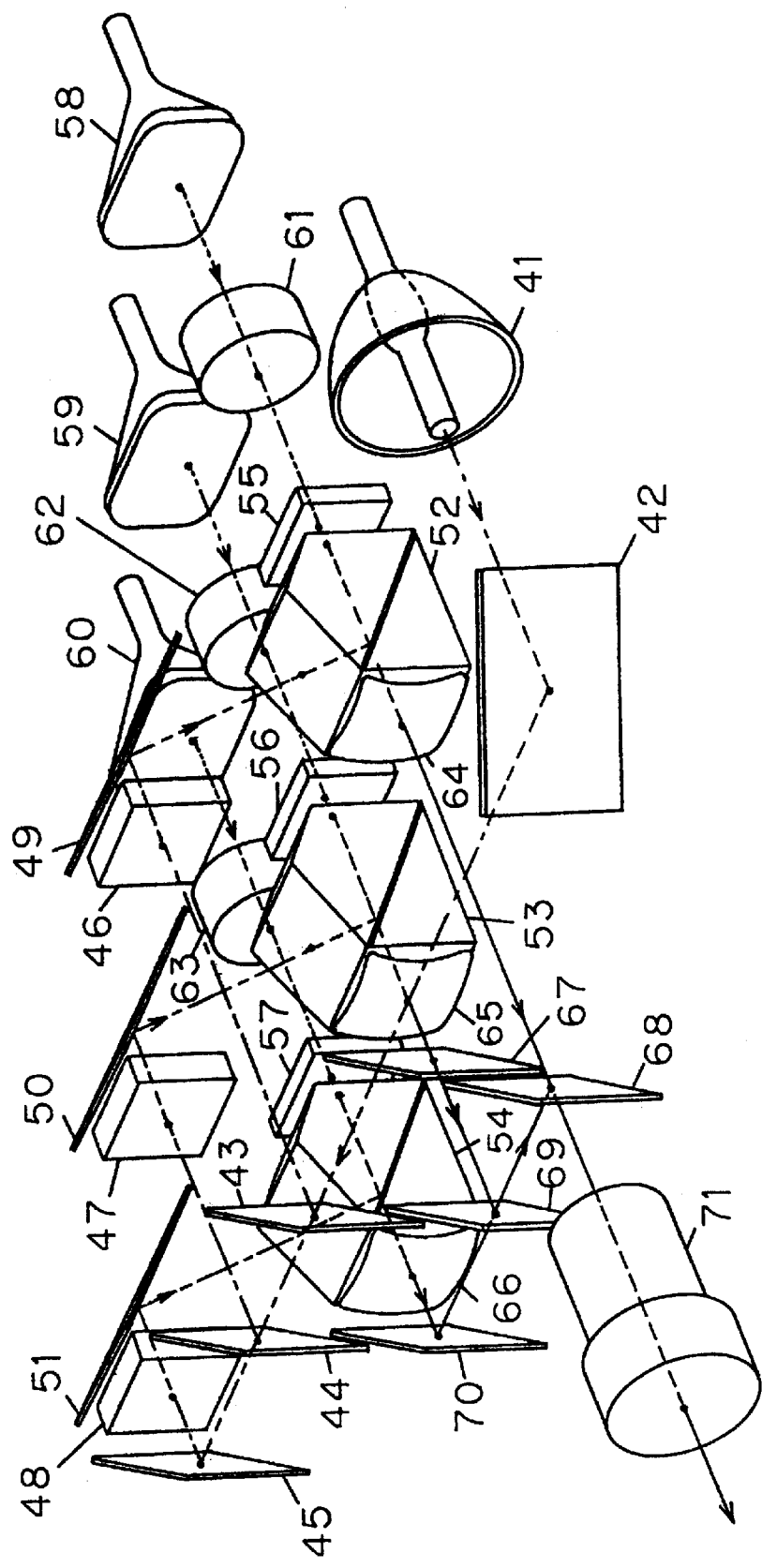
FIG. 5 is a perspective view showing the structure of an embodiment of the optical apparatus of the invention.
Figure 6:
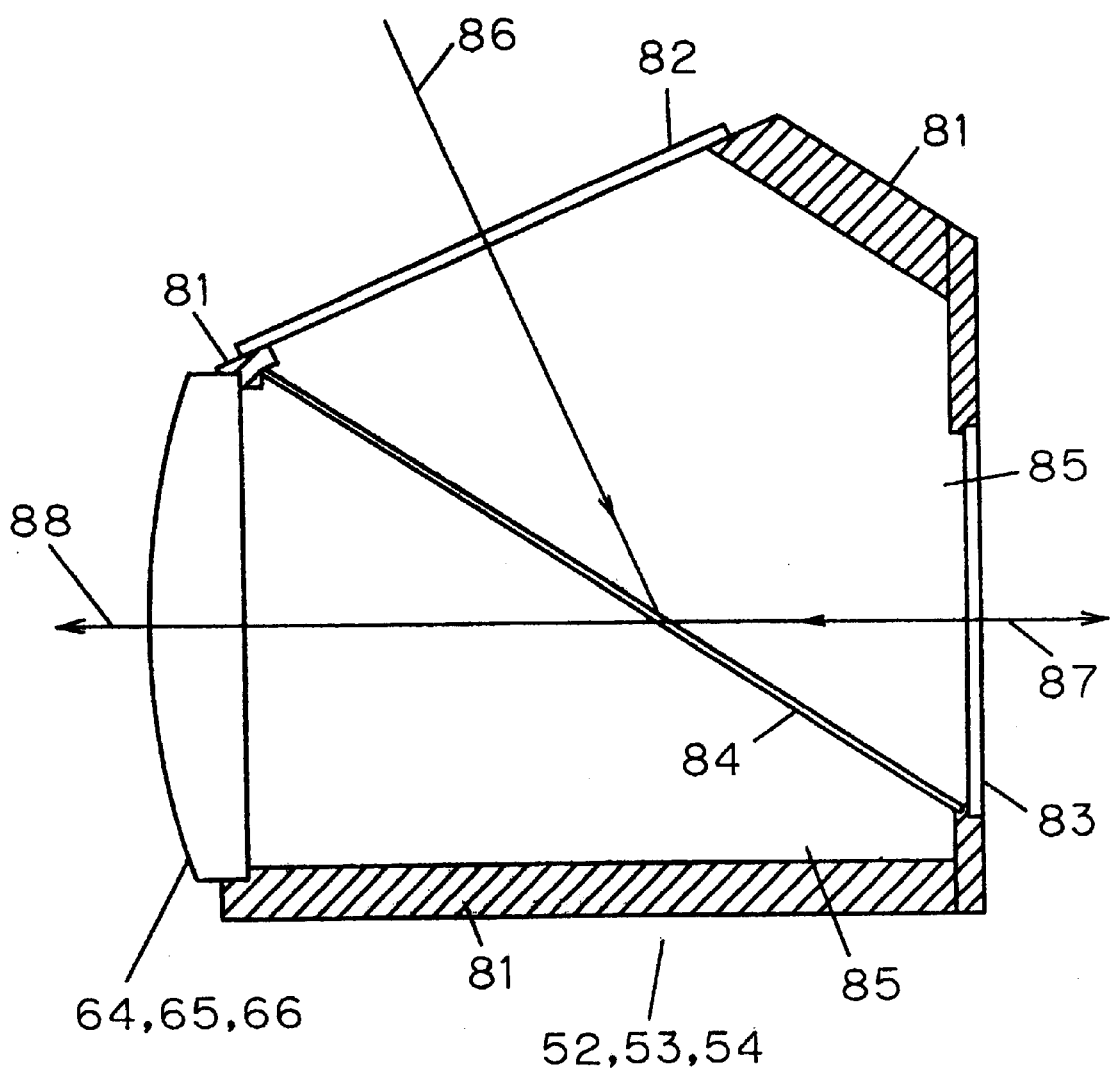
FIG. 6 is a sectional view showing the structure of the polarization beam splitter of the projection display apparatus of the invention.

Next, the structure of the polarization beam splitter is described in detail referring to FIG. 6. The polarization beam splitters 52, 53, 54 and the second lens group comprising lenses 64, 65, 66 shown in FIG. 6 are the same as the polarization beam splitters 52, 53, 54 and the second lens group comprising lenses 64, 65, 66 shown in FIG. 5.

Liquid 85 is filled in the space of the container comprising a frame 81, transparent plates 82, 83 and a polarizing and splitting mirror 84. The polarizing and splitting mirror 84 is made by evaporating a dielectric multilayer film on a transparent glass substrate. The dielectric multilayer film plane used as a polarizing and splitting plane closely contacts the surrounding liquid 85 to offer polarizing and splitting performance.

The liquid 85 used for the polarization beam splitters 52, 53, 54 is required to be transparent and uniform in optical characteristics, to have a low solidifying point and a high boiling point, and to be inexpensive. As a liquid almost satisfying the above-mentioned conditions, the present embodiment uses a mixture solution of three ingredients: 55 wt % of ethylene glycol, 30 wt % of diethylene glycol and 15 wt % of glycerin. This three-ingredient mixture solution is superior in optical performance, has a solidifying point of −52° C. and a boiling point of +198° C. The mixture solution can thus be used in the operation environment of the projection display apparatus in accordance with the present embodiment with no problem. In addition, the mixture solution is inexpensive. Consequently, the mixture solution is far superior to a glass prism both in weight and cost.

In addition, it is possible to use a liquid made by changing mixture ratio of the ingredients of the above-mentioned three-ingredient mixture solution mainly including ethylene glycol, or it is also possible to use pure ethylene glycol, aqueous solutions of ethylene glycol or the like. However, when the frame 91 is made of aluminum, aluminum oxide precipitates because of the reaction of the aluminum with water, and the liquid becomes cloudy gradually. Attention must be paid to this matter. Furthermore, it is possible to use a material (gelified transparent silicone resin KE1051 made by Shin-etsu Chemical Industry Co., Ltd., for example) which is liquid during assembly and becomes a solid or gel after the completion of the assembly.

The polarizing and selecting mirror 84 is made by evaporating a dielectric multilayer film comprising film layers having a low refractive index and film layers having a high refractive index being laminated alternatively on a glass substrate. The mirror 84 is a type which uses the interference effect of the dielectric multilayer film and the polarization angle wherein the maximum transmittance of P-polarized light component becomes the maximum. In this type of polarizing and splitting mirror, the optimal incident angle $\theta_M$ of a light beam can be obtained by the following formula, when the refractive index of the external medium is $n_M$, when the refractive index of the layer having the low refractive index is $n_L$, and when the refractive index of the layer having the high refractive index is $n_H$.

$$\sin^2\theta_M = \frac{(n_L n_H)^2}{n_m^2(n_L^2 + n_H^2)} \qquad (3)$$

In case the condition of the formula (3) is satisfied, the reflectivity of the S-polarized light component can be raised by increasing the number of layers of the dielectric multilayer film, while the transmittance of the P-polarized light component is maintained at 100%.

In the polarizing and splitting mirror 84 of the present embodiment, magnesium fluoride (refractive index 1.39) is used for the film having a low refractive index, and titanium dioxide (refractive index 2.30) is used for the film having a high refractive index. Since the refractive indexes of the liquids 86, 87, 88 are 1.44, the optimal incident angle of 55.6° is obtained from the formula (3). Accordingly, the polarizing and selecting mirror 84 is inclined 34.4° with respect to the optical axis of the projecting optical system. The dielectric multilayer film has 13 layers, and the thickness of each dielectric multilayer film is set so that the maximum reflectivity values of the S-polarized light components are obtained at the central wavelengths of the three primary color light components.

As described above, the reflectivity depends on the number of layers of the dielectric multilayer film, and the central wavelength of the reflection wavelength band depends on the thickness of each dielectric multilayer film.

Furthermore, the following two structures are used to expand the reflection wavelength band.

Namely, as a first structure, the polarizing and splitting mirror 84 is made by forming a first dielectric multilayer film and a second dielectric multilayer film (the reflection wavelength band of the former differs from that of the latter) on both planes of a glass substrate, whereby the reflection wavelength band of the S-polarized light component can be expanded as a whole. With this structure, proper polarizing and splitting performance can be delivered even when the wavelength bands of the light beams entering the polarization beam splitters 52, 53, 54 are wide.

As a second structure, the wavelength bands for reflecting S-polarized light components can be widened as the difference between the refractive index of the layers having a low refractive index and the refractive index of the layers having a high refractive index becomes larger, the layers being used to form the dielectric multilayer film. In the polarizing and splitting mirror 84 of the present embodiment, magnesium fluoride (a material having the lowest refractive index and being available as a transparent and durable material) and titanium dioxide (a material having the highest refractive index) are used so as to widen the reflection wavelength band of the S-polarized component as wide as possible. However, thin film materials having other refractive indexes can also be used. For example, silicon dioxide (refractive index 1.46) or dialuminum trioxide (refractive index 1.62) can be used for the layers having a low refractive index. Zinc sulfide (refractive index 2.30), cerium dioxide (refractive index 2.30), zirconium dioxide (refractive index 2.05), ditantalum pentaoxide (refractive index 2.10), hafnium dioxide (refractive index 2.00) or the like can be used for the layers having a high refractive index. In this case, however, the angle of the polarizing and splitting mirror 84 must be set so as to satisfy the condition of the formula (3).

As shown in FIG. 6, the S-polarized light component 86 entering the transparent plate 82 in the direction perpendicular thereto passes through the liquid 85, and enters the polarizing and splitting mirror 84 at an angle of 55.6°. The S-polarized light component 87 reflected by the polarizing and splitting mirror 84 passes through the liquid 85 and goes out from the transparent plate 83 to the reflecting light valve. The light reflected by the reflecting light valve passes through the transparent plate 83 and the liquid 85 again, and enters the polarizing and splitting mirror 84. The P-polarized light component 88 modulated by the reflecting light valve passes through the polarizing and splitting mirror 84, the liquid 85 and the second lens group 88, and travels to the first lens group 71 shown in FIG. 5. The S-polarized light component is not modulated and reflected again by the polarizing and splitting mirror 84 to the transparent substrate 82.

In the structure shown in FIG. 5, the plane including the normal lines of the reflection prevention plane of the transparent plate 67 and the color synthesizing planes of the dichroic mirrors 68, 69 constituting such a color synthesizing optical system as that shown in FIG. 4B and the optical axis of the projecting optical system is perpendicular to the plane including the normal line of the polarizing and splitting planes of the polarization beam splitters 52, 53, 54 and the optical axis of the projecting optical system. With this structure, the astigmatism generated at the transparent plate 67 and the dichroic mirrors 68, 69 is canceled by the astigmatism generated at the polarization beam splitters 52, 53, 54. The most significant feature of the structure of the present embodiment is that a difference in refractive index is provided between the liquid used as a medium and the glass substrate used as the polarizing and splitting mirrors for the polarization beam splitters 52, 53, 54 so that the polarization beam splitters 52, 53, 54 can have functions as a polarizer and an analyzer, and can also have a function to compensate for astigmatism generated at the color synthesizing optical system.

Figure 7A:
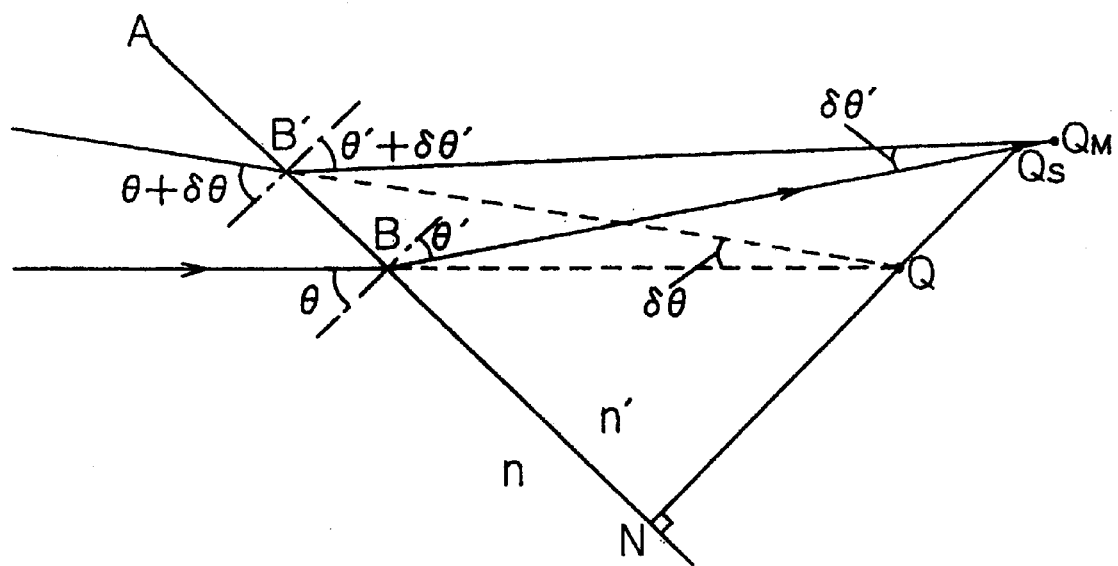
FIG. 7A is a view illustrating the principle of astigmatism when convergent light obliquely enters interface plane A having astigmatism.
Figure 7B:
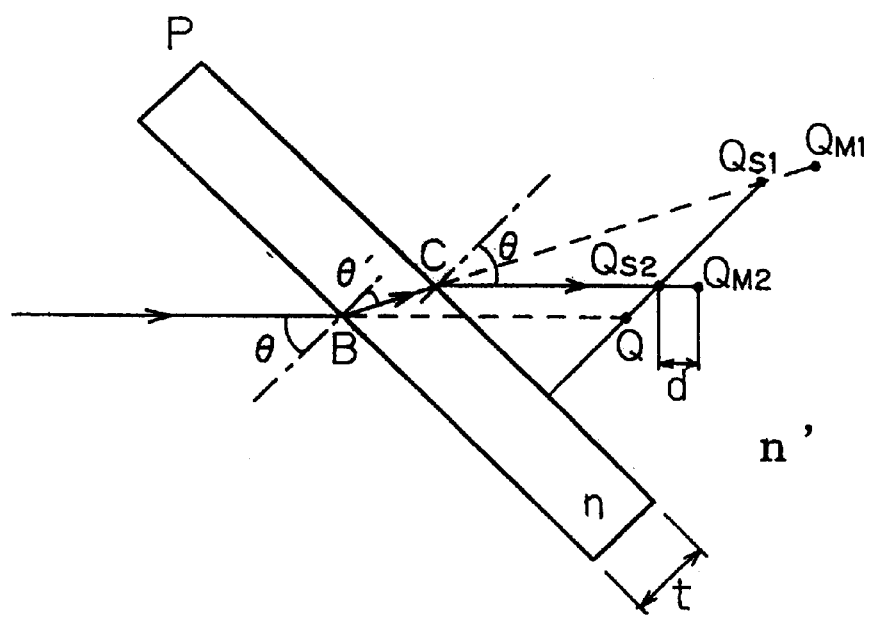
FIG. 7B is a view illustrating the principle of astigmatism when a transparent plate P having parallel planes is disposed obliquely with respect to the optical axis.

The principle of astigmatism generation and the amount of astigmatic difference are described below by using model figures (FIGS. 7A, 7B).

In FIG. 7A, convergent light obliquely enters interface plane A having astigmatism. It is assumed that a light beam traveling from an incident medium to point Q is refracted at point B on the interface plane A. When the refractive index of the medium on the incident side is n, the refractive index of the medium on the outgoing side is n', the incident angle is θ, and the refractive angle is θ', the following relationship can be established from Snell's law.

$$n \sin\theta = n'\sin\theta' \quad (4)$$

When the foot of the perpendicular line drawn from point Q to the interface plane A is N, it can be assumed that the sagittal paraxial ray in the medium on the incident side is located on a conical plane formed when straight line BQ is rotated round straight line NQ. Accordingly, the sagittal paraxial image point $Q_S$ is supposed to be on the straight line NQ.

From the relationship between $\Delta BNQ$ and $\Delta BNQ_S$, the following relationship can be established.

$$\overline{BQ}\sin\theta = \overline{BQ_S}\sin\theta' \quad (5)$$

From the formulas (4) and (5), the following formula can be obtained as a formula for representing the position of the sagittal paraxial image point $Q_S$.

$$\overline{BQ_s} = \frac{n'}{n}\overline{BQ} \quad (6)$$

On the other hand, an incident light beam traveling from the medium on the incident side toward point Q and entering point B' on the interface plane A is conceived. Point B' is slightly away from point B. The incident angle and the refractive angle of the incident light beam entering point B' are assumed to be $\theta+\epsilon\theta$ and $\theta'+\epsilon\theta'$, respectively. When the sine rule is applied to triangles $\Delta BB'Q$ and $\Delta BB'Q_M$, the following relationships can be obtained.

$$\frac{\overline{BB'}}{\sin\delta\theta} = \frac{\overline{BQ}}{\sin\{\pi/2 - (\theta + \delta\theta)\}} \quad (7)$$

$$\frac{\overline{BB'}}{\sin\delta\theta'} = \frac{\overline{BQ_M}}{\sin\{\pi/2 - (\theta' + \delta\theta')\}} \quad (8)$$

From the formulas (7) and (8), the following relationship can be obtained.

$$\overline{BQ_M} = \frac{\cos(\theta' + \delta\theta')\sin\delta\theta}{\cos(\theta + \delta\theta)\sin\delta\theta'}\overline{BQ} \quad (9)$$

When it is assumed that both $\epsilon\theta$ and $\epsilon\theta'$ are very small, the formula (9) can be written as follows:

$$\overline{BQ_M} = \frac{\cos\theta'}{\cos\theta}\frac{\delta\theta}{\delta\theta'}\overline{BQ} \quad (10)$$

When both sides of the formula (4) are differentiated by θ, the following relationship can be obtained.

$$n\cos\theta = n'\cos\theta'\frac{\delta\theta'}{\delta\theta} \quad (11)$$

When $\epsilon\theta'/\epsilon\theta$ is canceled from the formulas (10) and (11), the following formula can be obtained as a formula for representing the position of the meridional paraxial image point $Q_M$.

$$\overline{BQ_M} = \frac{n'\cos^2\theta'}{n\cos^2\theta}\overline{BQ} \quad (12)$$

By comparison between the formulas (6) and (12), when a light beam obliquely enters the interface plane having a difference in refractive index, it is understood that the sagittal paraxial image point $Q_S$ does not coincide with the meridional paraxial image point $Q_M$.

Next, a case wherein the transparent plate P having parallel planes is disposed obliquely to the optical axis as shown in FIG. 7B is conceived. It is assumed that the thickness of the transparent plate P is t, that the refractive index thereof is n, and that the refractive index of the external medium of the transparent plate P is n'.

It is assumed that the paraxial image point is Q when the transparent plate P is not present, that the incident point is B when a light beam traveling along the optical axis enters the transparent plate P, and that the outgoing point is C. In addition, it is assumed that the sagittal paraxial image point is $Q_{S1}$ and that the meridional paraxial image point is $Q_{M1}$, these points corresponding to point Q for the incident plane of the transparent plate P. Furthermore, it is assumed that the sagittal paraxial image point is $Q_{S2}$, and that the meridional paraxial image point is $Q_{M2}$, these points corresponding to point $Q_{S1}$ for the outgoing plane.

From the formulas (6) and (12), the following formulas can be established.

$$\overline{BQ_{S1}} = \frac{n}{n'}\overline{BQ} \quad (13)$$

$$\overline{BQ_{M1}} = \frac{n\cos^2\theta'}{n'\cos^2\theta}\overline{BQ} \quad (14)$$

$$\overline{CQ_{S2}} = \frac{n'}{n}\overline{CQ_{S1}} \quad (15)$$

$$\overline{CQ_{M2}} = \frac{n'\cos^2\theta}{n\cos^2\theta'} \quad (16)$$

When the thickness of the transparent plate P is t and the incident angle of the light beam is θ, the following relationship can be obtained.

$$\overline{BC} = \frac{t}{\cos\theta'} \quad (17)$$

In addition, referring to FIG. 7B, the following relationships can be obtained.

$$\overline{CQ_{S1}} = \overline{BQ_{S1}} - \overline{BC} \quad (18)$$

$$\overline{CQ_{M1}} = \overline{BQ_{M1}} - \overline{BC} \quad (19)$$

When the formulas (13), (14) and (17) are substituted into the formulas (18) and (19), and when the results are substituted into the formulas (15) and (16), the following formulas can be obtained.

$$\overline{CQ_{S2}} = \overline{BQ} - \frac{n't}{n\cos\theta'} \quad (20)$$

$$\overline{CQ_{M2}} = \overline{BQ} - \frac{n'\cos^2\theta}{n\cos^3\theta'}t \quad (21)$$

From the formulas (20) and (21), the paraxial image points $Q_{S2}$ and $Q_{M2}$, which correspond to the paraxial image point Q when the transparent plate P is disposed obliquely to the optical axis, can be obtained. When the transparent plate P is not perpendicular to the optical axis, point $Q_{S2}$ does not coincide with point $Q_{M2}$, and it is thus understand that astigmatism generates.

Distance d between the sagittal paraxial image point $Q_{S2}$ and the meridional paraxial image point $Q_{M2}$ is represented by the following formula.

$$d = \overline{CQ_{M2}} - \overline{CQ_{S2}} \quad (22)$$

When the formulas (20) and (21) are substituted into the formula (22), and θ' is canceled by using the formula (4), the astigmatic difference d can be obtained from the following formula.

$$d = \frac{n'(n^2 - n'^2)\sin^2\theta}{(n^2 n'^2 \sin^2\theta)^{3/2}}t \quad (23)$$

When the medium is air, refractive index n' is 1. The formula (23) can thus be represented by the following formula.

$$d = \frac{(n^2 - 1)\sin^2\theta}{(n^2 - \sin^2\theta)^{3/2}}t \quad (24)$$

In the structure shown in FIG. 5, the transparent plate 67, the dichroic mirrors 68, 69, the second lens group comprising lenses 64, 65, 66 and the polarization beam splitters 52, 53, 54 are disposed as shown in the model figure (FIG. 4B) to compensate for astigmatism. In this arrangement method, the effect of the second lens group comprising lenses 64, 65, 66 in particular is explained below referring to a schematic figure of the projecting optical system shown in FIG. 8.

Figure 8:
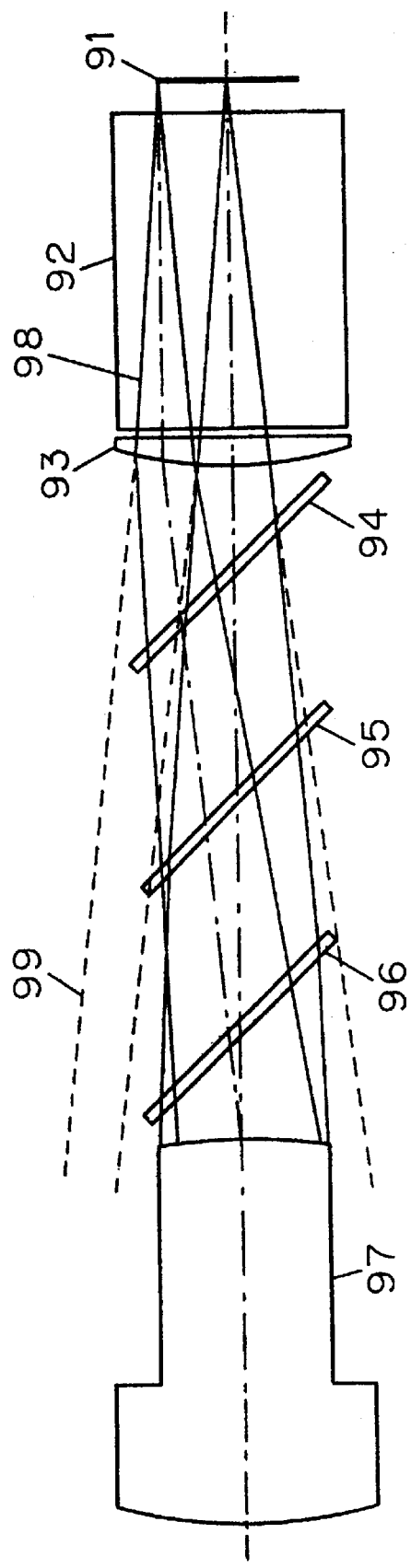
FIG. 8 is a schematic structural view showing the projecting optical system of the optical apparatus of the invention.

When it is supposed that the reflecting light valve 91 shown in FIG. 8 corresponds to the reflecting light valve 56 shown in FIG. 5, the polarization beam splitter 92, the second lens group 93, the parallel plane plates 94, 95, 96 constituting the color synthesizing optical system correspond to the polarization beam splitter 53, the transparent plane 67 and the dichroic mirrors 69, 68, respectively. In addition, the first lens group 97 shown in FIG. 8 corresponds to the first lens group 71 shown in FIG. 5.

Reflected light from the reflecting light valve 91 passes through the polarization beam splitter 92, the second lens group 93, the parallel plane plates 94, 95, 96 used as the dichroic mirrors constituting the color synthesizing optical system, the transparent plate or the plane mirrors, and the first lens group 97, and is projected on a screen (not shown).

Solid line 98 represents a light beam when the second lens group 93 is used, and broken line 99 represents a light beam when the second lens group 93 is not used.

Since the projection display apparatus of the present embodiment uses the reflecting light valve 91, and the polarization beam splitter 92 wherein a multilayer film is used as a polarizer and an analyzer, the contrast at the periphery of a projected image in particular depends on the incident angle of the incident light beam entering the polarization beam splitter 92. Therefore, the light beam passing through the polarization beam splitter 92 should preferably be nearly telecentric.

In addition, the optical axes from the reflecting light valves 55, 56, 57 to CRTs 58, 59, 60 should preferably be parallel with one another as shown in FIG. 5 to make the whole size of the apparatus compact. In other words, the polarizing and splitting planes of the polarization beam splitters 52, 53, 64 should preferably be parallel with one another. To attain this, a space is necessary to accommodate a polarization beam splitter 92 having both the polarizing and splitting function and the astigmatism compensation function and at least three parallel plane plates as the color synthesizing optical system between the first lens group 97 and the reflecting light valve 91. In this case, the back focus of the projection lens required to be very long. In the present embodiment, since the effective display area size of the reflecting light valve 91 is 2.5 inches diagonally (length-to-width ratio 3:4), the focal length of the projection lens is about 78 mm, and the F number is 4.0, the back focus should be at least 320 mm or more in terms of the length of optical path in air, and should preferably be 350 mm or more. When an attempt is made to implement a projection lens by using only the first lens group 97, light from the polarization beam splitter 92 travels as shown by broken lines 99. Therefore, the lens on the reflecting light valve side of the projection lens and the parallel plane plates 94, 95, 96 constituting the color synthesizing optical system are required to have large diameters. As a result, both the projection lens and the color synthesizing optical system become very expensive, and the projection lens becomes heavy.

When the second lens group 93 having positive power is disposed sufficiently away from the first lens group 97 so that the entire projection lens comprises two groups having long spaces, the light travels as shown by solid lines 98, whereby the entire projecting optical system can be made compact. The second lens group 93 may be made of plastic, and the periphery thereof may be cut to obtain a rectangular shape depending on the effective area of the light outgoing from the polarization beam splitter 98.

By disposing the second lens group 93 between the parallel plane plates 94, 95, 96 and the polarization beam splitter 92, the entire apparatus can be made compact and telecentric, and can have an astigmatism compensation function. This structure is also effective for an optical apparatus wherein transparent plates having parallel planes and only the astigmatism compensation function are disposed instead of the polarization beam splitter 92.

Figure 9:
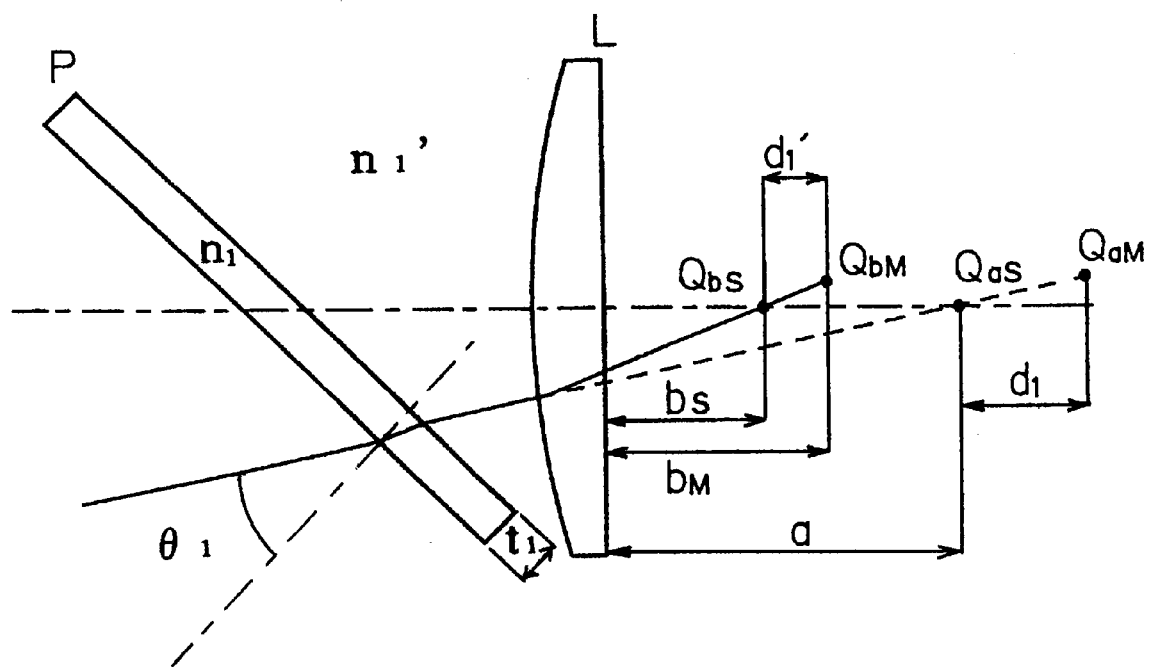
FIG. 9 is a view illustrating astigmatic difference.

Next, astigmatism generated at the transparent plate 67 and the dichroic mirrors 68, 69 when the second lens group comprising lenses 64, 65, 66 having power is disposed is described below referring to the model figure (FIG. 9). It is assumed that light travels from the screen to the reflecting light valve.

The transparent plate P having parallel planes and shown in FIG. 9 corresponds to the transparent plate 67 and the dichroic mirrors 68, 69 shown in FIG. 5, and the lens L shown in FIG. 9 corresponds to the second lens group comprising lenses 64, 65, 66 shown in FIG. 5.

When it is assumed that the focal length of the lens L is f, that the sagittal paraxial image point without the lens L is $Q_{aS}$, that the meridional paraxial image point is $Q_{aM}$, that the astigmatic difference is $d_1$, and that the distance from the principal plane of the lens L to the sagittal paraxial image point $Q_{aS}$ is a, the sagittal magnification $m_S$ and the meridional magnification $m_M$ of a virtual image formed by the lens L can be represented by the following formulas.

$$m_s = \frac{f}{f+a} \tag{25}$$

$$m_M = \frac{f}{f+a+d_{-1}} \tag{26}$$

Furthermore, when it is assumed that the sagittal paraxial image point with the lens L provided is $Q_{bS}$, that the meridional paraxial image point is $Q_{bM}$, that the astigmatic difference is $d_1'$, that the distance from the principal plane of the lens L to the sagittal paraxial image point $Q_{bS}$ is $b_S$, and that the distance from the principal plane of the lens L to the meridional paraxial image point $Q_{bM}$ is $b_M$, the following formulas are obtained.

$$b_S = m_S a \tag{27}$$

$$b_M = m_M(a+d_1) \tag{28}$$

$$d_1' = b_M - b_S \tag{29}$$

From the formulas (25), (26), (27), (28) and (29), the astigmatic difference $d_1'$ can be represented by the following formula.

$$d'_1 = \frac{f^2}{(f+a+d_1)(f+a)} d_1 \tag{30}$$

When $d_1$ is sufficiently smaller than f and a, the formula (30) can be approximated as follows.

$$d'_1 = \left(\frac{f}{f+a}\right)^2 d_1 = m_S^2 d_1 \tag{31}$$

Accordingly, when it is assumed that the thickness of the transparent plate P is $t_1$, that the refractive index of the plate P is $n_1$, that the refractive index of the medium is $n_1'$, and that the incident angle to the transparent plate P is $\theta_1$, the astigmatic difference $d_1'$ of the transparent plate P shown in FIG. 9 can be obtained by the following formula on the basis of the formulas (23) and (31).

$$d'_1 = \frac{m_s^2(n_1^2 - n_1'^2)\sin^2\theta_1}{(n_1^2 - n_1'^2\sin^2\theta_1)^{3/2}} t_1 \tag{32}$$

On the other hand, astigmatic difference $d_2$ generated by the polarization beam splitters 52, 53, 54 shown in FIG. 5 can be obtained from the following formula (23), when it is assumed that the thickness of the polarizing and splitting mirror substrate is $t_2$, that the refractive index of the substrate is $n_2$, that the refractive index of the liquid is $n_2'$, and that the incident angle from inside the liquid to the polarizing and splitting plane is $\theta_2$.

$$d_2 = \frac{n_2'(n_2^2 - n_2'^2)\sin^2\theta_2}{(n_2^2 - n_2'^2\sin^2\theta_2)^{3/2}} t_2 \tag{33}$$

Since the astigmatic difference $d_2$ is a value obtained in the liquid, the astigmatic difference $d_2'$ in the air obtained after the light components are delivered from the polarization beam splitters 52, 53, 54, namely, the astigmatic difference $d_2'$ converted in terms of air can be represented by the following formula on the basis of the relationship of $d_2' = d_2/n_2'$.

$$d'_2 = \frac{(n_2^2 - n_2'^2)\sin^2\theta_2}{(n_2^2 - n_2'^2\sin^2\theta_2)^{3/2}} t_2 \tag{34}$$

On the basis of the formulas (32) and (34), the projecting optical system shown in FIG. 5 can compensate for astigmatism when the following formula is satisfied.

$$d_1' = d_2' \tag{35}$$

On the basis of the formulas (32) and (34), it is understood that the plate thickness values $t_1$ and $t_2$ should satisfy the condition of the following formula.

$$\frac{t_2}{t_1} = \frac{m_s^2(n_1^2 - n_1'^2)\sin^2\theta_1}{(n_2^2 - n_2'^2)\sin^2\theta_2} \left(\frac{n_2^2 - n_2'^2\sin^2\theta_2}{n_1^2 - n_1'^2\sin^2\theta_1}\right)^{3/2} \tag{36}$$

In the structure shown in FIG. 5, since the transparent plate 67, the substrates of the dichroic mirrors 68, 69, and the substrates of the polarizing and splitting mirrors of the polarization beam splitters in the color synthesizing optical system have the same refractive index, $n_1=n_2$ can be established. Furthermore, since the medium for the transparent plate 67 and the dichroic mirrors 68, 69 is air, $n_1'=1$ can be established. Therefore, the formula (36) is represented as follows.

$$\frac{t_2}{t_1} = \frac{m_s^2(n_1^2 - 1)\sin^2\theta_1}{(n_1^2 - n_2'^2)\sin^2\theta_2}\left(\frac{n_1^2 - n_2'^2\sin^2\theta_2}{n_1^2 - \sin^2\theta_1}\right)^{3/2} \quad (37)$$

The above-mentioned concept of the astigmatism and the compensation conditions of the astigmatism have been explained with respect to the optical axis of the projecting optical system or a light beam passing close to the optical axis. In case a light beam passes through a position away from the optical axis at a larger angle with respect to the optical axis, the astigmatism becomes more different from that obtained near the optical axis in the strict sense. However, the basic concept and tendency of the astigmatism generated when a light beam having an image forming capability passes through a transparent plate having parallel planes and inclined with respect to the optical axis are similar to those obtained when a light beam passes through the optical axis. Particularly when the transparent plate is relatively thin, the concept and tendency are not different significantly from those obtained when a light beam passes through the optical axis. Consequently, satisfying the above-mentioned astigmatism compensation conditions is sufficiently effective in improving the resolution of the entire effective area of an image projected by the projection display apparatus shown in FIG. 5.

All the refractive index values are obtained at light beam e (546.07 nm) located close to the central wavelength of the visible light. The refractive index has a wavelength dispersion characteristic; the refractive index slightly differs depending on the wavelength. Strictly speaking, the refractive index should preferably be optimized depending on the conditions of the primary color components (red, blue and green). However, no significant problem occurs in the astigmatism compensation effect, even when light beam e, namely, green light having the highest visibility among the visible light components and dominantly affecting the resolution of projected images is used as the reference light beam.

In the embodiment, the focal length f of the second lens group comprising lenses 64, 65, 66 is 240 mm, and the distance a from the principal plane of the second lens group to the sagittal paraxial image point, without the second lens group comprising lenses 64, 65, 66, is 110 mm. From the formula (25), the sagittal magnification $m_S$ is about 0.686. The refractive index $n_1$ of the transparent plate 67, the substrates of the dichroic mirror s 68, 69 and the substrates of the polarizing and splitting mirrors of the polarization beam splitters 52, 53, 54 is 1.52, the refractive index $n_2$ of the liquid of the polarization beam splitters 52, 53, 54 is 1.44, the incident angle $\theta_1$ from the medium (air) to the transparent plate 67 and the dichroic mirrors 68, 69 is 45°, and the incident angle $\theta_2$ from the liquid to the polarizing and splitting mirrors 84 of the polarization beam splitters 52, 53, 54 is 55.6°. From the formula (37), $t_2/t_1$ is 0.668.

The plane accuracy of the reflecting planes of the dichroic mirrors 68, 69 and the plane mirror 70 shown in FIG. 5 has significant effects on the resolution of the projecting optical system. In addition, the plane accuracy significantly depends on the thickness values of the substrates. When high-resolution projected images such as high-definition TV images, are displayed, and when the plane is deformed in a concave or convex shape from an ideal plane (with an infinite radius of curvature), the plane accuracy of the reflecting planes should be at least ±2λ (λ: the central wavelength of incident light) in terms of the radius of curvature, and should preferably be ±λ or less.

If the substrate is thin, the plane accuracy is apt to be deteriorated because of the stress caused when a dielectric multilayer film is evaporated or because of pressure applied by peripheral mechanical parts when the substrate is assembled and secured in an apparatus. The effective areas of the dichroic mirrors 68, 69 and the plane mirror 70 in the present embodiment are required to be at least 80×60 mm or larger. To satisfy the above-mentioned accuracy conditions after plan e surface grinding, the thickness of the substrate should be at least 1.5 mm or more, and should preferably be 2 mm or more. Since the plane mirror 70 is a plane mirror, its substrate can have a sufficient thickness without causing any problems. However, if the substrates of the dichroic mirrors 68, 69 are too thick, it is difficult to compensate for the astigmatism of the light beam passing away from the optical axis of the projecting optical system. Accordingly, the thickness of the substrates should be at least 3.0 mm or less and should preferably be 2.5 mm or less.

Consequently, the thickness values of the substrates of the dichroic mirrors 68, 69 should be in the range of 1.5 mm or more to 3.0 mm or less. In addition, since the light beams from the reflecting light valves 55, 56, 57 just pass through the polarization beam splitters 52, 53, 54 in the optical paths in the projecting optical system, it is assumed that the deterioration of resolution due to the plane accuracy of the substrates of the polarizing and splitting mirrors is negligible.

Because of these reasons, the thickness $t_1$ of the transparent plate 67 and the dichroic mirrors 68, 69 in the present embodiment is set to about 2.0 mm, and the thickness $t_2$ of the substrates of the polarizing and splitting mirrors is set to about 1.3 mm on the basis of the calibration results from the formula (37). With these settings, the astigmatism of the entire projecting optical system can be compensated for properly, and high-resolution projected images can be displayed.

The above explanation applies to the case wherein the astigmatism generated at the transparent plate 67 and the dichroic mirrors 68, 69 of the color synthesizing optical system is made smaller by the square of the virtual image magnification m of the second lens group (64, 65, 66), and the astigmatism having been made smaller is canceled by the astigmatism generated at the polarizing and splitting mirrors 84 of the polarization beam splitters (52, 53, 54).

Unlike the above-mentioned embodiment, the embodiment described below corresponds to a case wherein the astigmatism generated at the color synthesizing optical system is canceled with the astigmatism generated at the polarizing and splitting mirror 84 without using the second lens group.

In other words, this case corresponds to a case obtained when $m_S=1$ in the formula (37). Accordingly, although $t_2/t_1=0.668$ is derived in the above-mentioned embodiment wherein the virtual image magnification of the second lens group $m_S=0.686$, in the present embodiment, $t_2/t_1=0.668/0.686^2=1.419$ is obtained from the formula (37).

For this reason, when $t_1=2.0$ mm, $t_2=2.839$ mm is obtained. In this case, the thickness of the polarizing and splitting substrate of the polarization beam splitter should be 2.84 mm.

Figure 10:
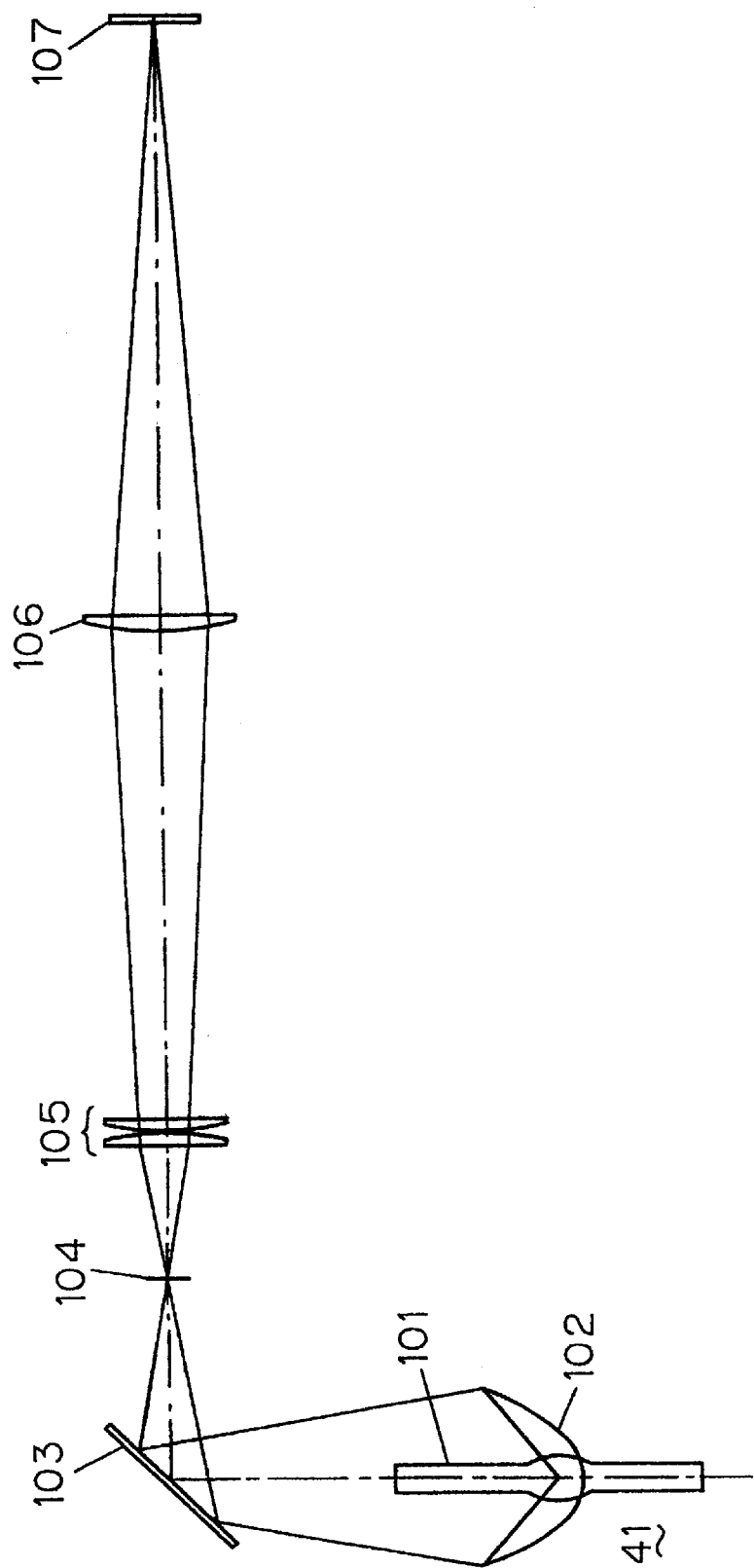
FIG. 10 is a schematic view showing the structure of the illuminating optical system of the optical apparatus of the invention.

Among the structures shown in FIG. 5, the structure of the illuminating optical system is described below referring to FIG. 10. Relay lenses 105, 106 should be disposed as shown in FIG. 10 in the optical path wherein the light beam from the light source 41 illuminates the reflecting light valves 55, 56, 57, although the relay lenses are not shown in FIG. 5. The reflecting light valve 107 is the same as the reflecting light valves 55, 56, 57 shown in FIG. 5. The color separating optical system comprising the dichroic mirrors 43, 44, 45, the prepolarizers 46, 47, 48 and the plane mirrors 49, 50, 51 shown in FIG. 5 are disposed between the first relay lens 105 and the second relay lens 106. The polarization beam splitters 52, 53, 54 are disposed between the second relay lens 106 and the reflecting light valve 108. The light source 41 comprises a lamp 101 and an elliptic plane mirror 102. The lamp 101 is a xenon lamp generating the three primary color components. The elliptic plane mirror 102 is made of glass, and the reflecting plane thereof is coated with an aluminum thin-film layer. The reflecting plane may be made by evaporating a multilayer film allowing infrared light to pass through and visible light to be reflected.

Light from the lamp 101 is reflected by the elliptic plane mirror 102, and the infrared light component of the light is eliminated by a cold mirror 103, and the resultant light converges at the second focal point 104 of the elliptic plane mirror 102. After passing through the second focal point 104, the light becomes divergent light and is converted into nearly parallel beams by the first relay lens 105. Since the spectral performance of the dichroic mirrors using a dielectric multilayer film is changed depending on the incident angle of the light, the light beams passing through the dichroic mirrors should preferably be as parallel as possible with one another. The nearly parallel light beams are converged again by the second relay lens 106 so as to illuminate the reflecting light valve 107. The relay lenses 105, 106 have a role of efficiently illuminate the image of the lamp 101 formed at the second focal point 103 of the elliptic plane mirror 102 at the enlarged magnification corresponding to the effective display area of the reflecting light valve 107. Although the first relay lens 105 comprises two lens components in FIG. 10, the number of lens components may be single or three or more. Furthermore, the second relay lens 106 may be disposed between the color separating optical system and the prepolarizers 46, 47, 48, or between the prepolarizers 46, 47, 48 and the plane mirrors 49, 50, 51 leading light beams to the polarization beam splitters shown in FIG. 5. Moreover, although a xenon lamp is used as the lamp 101, a metal halide lamp or a halogen lamp may also be used.

Figure 11:
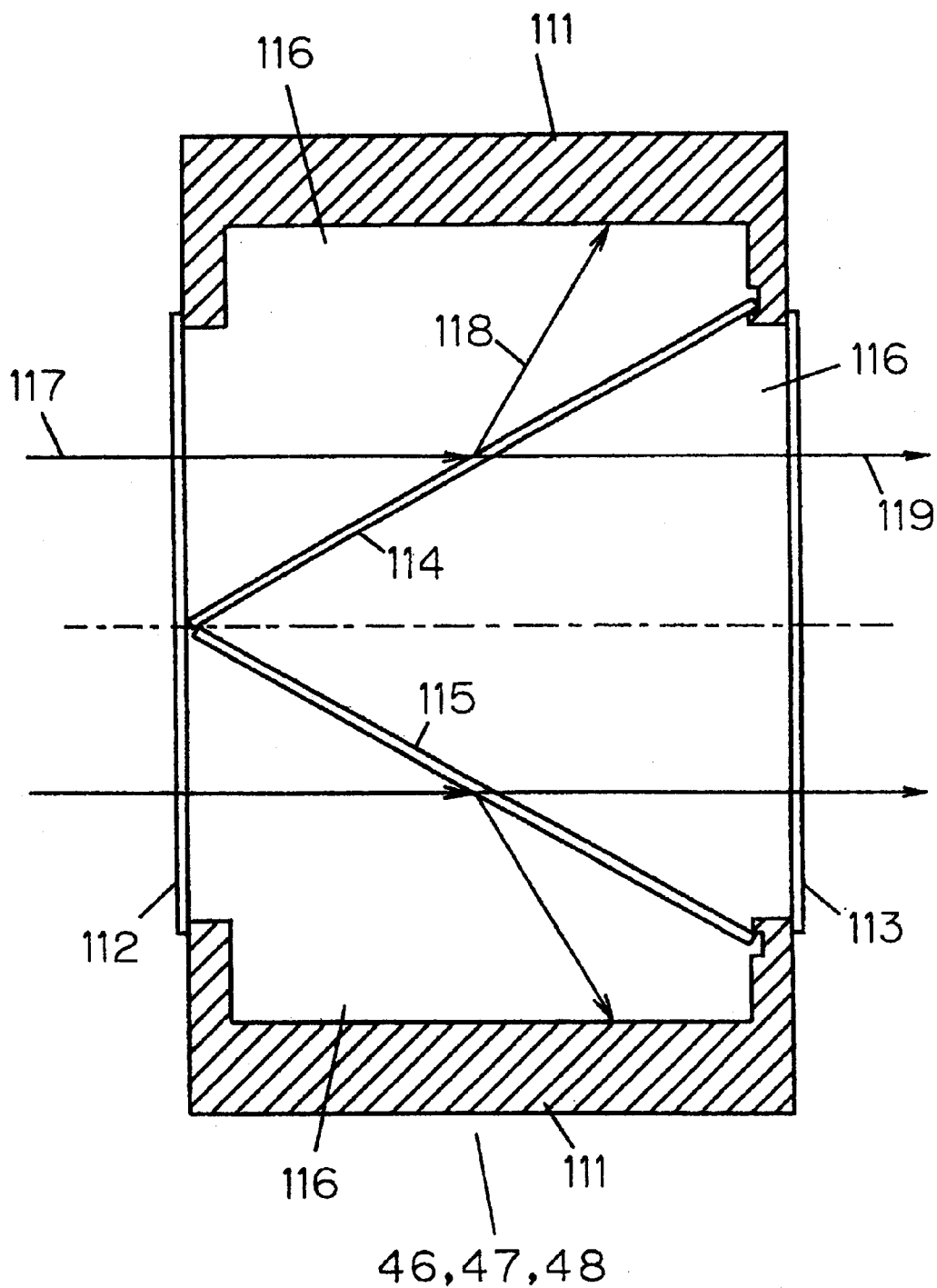
FIG. 11 is a sectional view showing the structure of the prepolarizer of the optical apparatus of the invention.

The structures of the prepolarizers 46, 47, 48 are described in detail referring to FIG. 11.

A V-shaped groove is formed inside a frame 111. The end portions of polarizing and selecting mirrors 114, 115 are inserted in the groove, and the mirrors are disposed so that their cross-sections form a V-shape. Liquid 116 is filled in the space of the container comprising the frame 111, incident and outgoing light windows 112 and 113 made of glass substrates and polarizing and splitting mirrors 114, 115. The liquid material and the multilayer films of the polarizing and splitting mirrors 114, 115 are the same as the liquid material and the polarization beam splitters 52, 53, 54 shown in FIG. 6.

Natural light 117 perpendicularly entering the prepolarizers 46, 47, 48 passes through the incident light window 112 and the liquid 116 and enters the polarizing and splitting mirror 114 at an angle of 5.6° as shown in FIG. 11. The natural light 117 is separated into an S-polarized light component 118 and a P-polarized light component 119 by the polarizing and splitting mirror 114. The P-polarized light component 119 passes through the liquid 116 and goes out from the outgoing light window 113, and the S-polarized light component 118 enters the inner wall of the frame 111.

To make the prepolarizers 46, 47, 48 compact, two pieces of polarizing and splitting mirrors 114, 115 are used and disposed in a V-shape being symmetrical with respect to the optical axis. The vertex of the V-shape should be disposed to the light source so that the S-polarized light components reflected by the polarizing and splitting mirrors 114, 115 and become unnecessary do not travel to the outgoing light window 113. In case a single polarizing and splitting mirror is used, the dimension of the prepolarizer increases in the direction of the optical axis. In addition, when light obliquely enters the prepolarizer, the dependence on incident angle becomes non-symmetric, and this effect is apt to be developed on projected images and causes a problem. Furthermore, three or more polarizing and splitting mirrors may be disposed in a zigzag pattern. However, when the number of polarizing and splitting mirrors is odd, the mirrors are disposed non-symmetrically with respect to the optical axis. Therefore, a structure comprising an even number of mirrors is preferable. Besides, after the S-polarized light components are reflected by the polarizing and splitting mirrors and becomes unnecessary may enter adjacent polarization beam splitters and parts of the multiply reflected light components may travel to the outgoing light window 113. If the unnecessary polarized light components reach the polarization beam splitters 52, 53, 54 and the reflecting light valves 55, 56, 57 shown in FIG. 5, it should be noted that the contrast of projected images may be deteriorated significantly. In this way, it is understand that the prepolarizer having the structure shown in FIG. 11 can effectively deliver light close to linear polarized light.

The prepolarizer and the polarization beam splitter are disposed so that the P-polarized light component going out from the prepolarizer is reflected as an S-polarized light component by the polarization beam splitter. Generally speaking, the incident light expands in a certain angular range around the optical axis, and the incident light has more than one wavelengths. Therefore, it is relatively easy to increase the reflectivity of the S-polarized light component close to 100% even in the usage conditions of the above-mentioned incident light by increasing the number of the layers of the dielectric multilayer film of the polarizing and splitting mirror. However, it is difficult to increase the transmittance of the P-polarized light component close to 100%. Therefore, it is preferable that the P-polarized light component should be delivered when using a prepolarizer which is required to eliminate unnecessary polarized light components. The linear polarized light component entering the polarization beam splitter should preferably be an S-polarized component so that the linear polarized light component entering the polarization beam splitter can be led effectively to the reflecting light valve and so that the light to be read which has been reflected by the reflecting light valve can be eliminated by the polarization beam splitter in the case of display in black. With these methods, projected images can be displayed at high contrast.

Since the projection display apparatus of the invention shown in FIG. 5 uses the second lens group comprising lenses 64, 65, 66, the telecentric characteristic of the light beams passing through the polarization beam splitters 52, 53, 54 is superior even when the projecting optical system is compact. Therefore, the principal light beam entering the polarizing and splitting plane of the polarization beam splitter is nearly parallel with the optical axis of the projecting optical system, and the deterioration of the polarizing and splitting performance due to the dependence on the incident angle of the light beam entering the polarizing and splitting plane hardly occurs. Consequently, the problem of generating low or nonuniform contrast of projected images due to the deterioration of the polarizing and splitting performance does not occur, whereby projected images with high quality can be displayed.

In addition, the structure shown in FIG. 5 has a single projection lens substantially, no color shading occurs. Furthermore, since the illuminating optical paths for three colors from the light source 41 to the reflecting light valves 55, 56, 57 are identical, and since the display centers of the reflecting light valves 55, 56, 57 are located on the optical axes of the projection lenses, nonuniform color display hardly occurs.

Although the present embodiment has a structure wherein the three CRTs, the writing lens, the reflecting light valves, the polarization beam splitters and the second lens group are arranged in the horizontal direction of the CRT display screens, the components of the structure may also be arranged in the vertical direction.

Furthermore, although a CRT is used as an image source in the present embodiment, a transmission type TFT liquid crystal panel for example may be used so that the panel is illuminated from behind by a light source such as a metal halide lamp and so that optical images formed depending on video signals on the liquid crystal panel are formed on the photoconductive layer of the reflecting light valve by a writing lens. Moreover, instead of the writing lens, an optical fiber used as an image guide may also be used in the writing optical system.

Another embodiment of the present invention will be described below.

Figure 12:
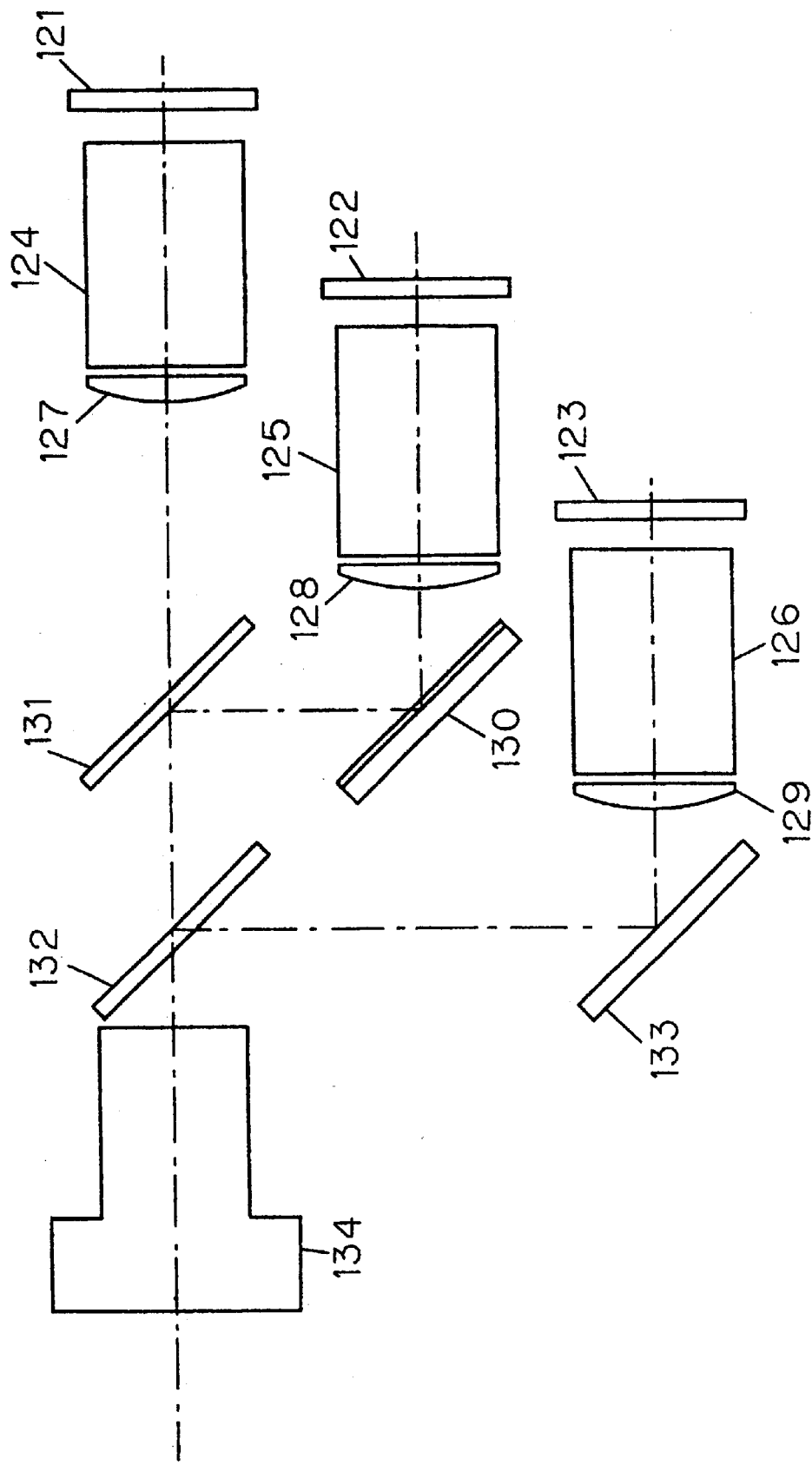
FIG. 12 is a schematic view showing the structure of the projecting optical system of an optical apparatus in accordance with another embodiment of the invention.

FIG. 12 is a view showing the structure of a projecting optical system which differs from the structure of the projection display apparatus shown in FIG. 5 only in the structure of the color synthesizing optical system.

The color synthesizing optical system of this embodiment comprises plane mirrors 130, 133 and dichroic mirrors 131, 132.

Light from the reflecting light valve 121 passes through a polarization beam splitter 124 and a second lens group 127, and also passes through two dichroic mirrors 131, 132, and then enters a first lens group 134. In addition, light from the reflecting light valve 122 passes through a polarization beam splitter 125 and a second lens group 128, is reflected by a plane mirror 130 made by joining a transparent plate having parallel planes to a plane mirror and is also reflected by a dichroic mirror 131, and passes through the dichroic mirror 132, and then enters the first lens group 134. Furthermore, light from a reflecting light valve 123 passes through a polarization beam splitter 126 and a second lens group 129, is reflected by a plane mirror 133 and the rear plane of the dichroic mirror 132, and enters the first lens group 134.

The reflecting planes of the plane mirrors 130, 133, and the color synthesizing planes of the dichroic mirrors 131, 132 are inclined by 45° with respect to the optical axis. The substrates of the dichroic mirrors 131, 132 and the transparent plate joined to the reflecting plane of the plane mirror 130 are the same as the various substrates shown in FIG. 5.

In the color synthesizing optical system of the projecting optical system shown in FIG. 12, by virtually using the reflection planes of the dichroic mirrors 131, 132 for rear reflection, the astigmatism compensation conditions of the light beams going out from the three reflecting light valves 121, 122, 123 are made identical.

In consideration of the condition formula (35) and the plane accuracy of the reflecting plates of the dichroic mirrors 131, 132, each thickness $t_2$ of the substrates of the polarizing and splitting mirrors of the polarization beam splitters 124, 125, 126 is set to 2 mm, the thickness of the substrate of the transparent plate joining to the reflecting plane of the plane mirror 130 is set to 0.75 mm, each thickness of the substrates of the dichroic mirrors 131, 132 is set to 1.5 mm, and the total thickness $t_1$ of the parallel plane plate for each color in the color synthesizing optical system is set to 3.0 mm.

In this case, the thickness values $t_1$, $t_2$ of the substrates used in the formula (36) are represented by the following formulas.

$$t_1 = t_{11} + t_{12} + \ldots + t_{1i} \quad (38)$$

$$t_2 = t_{21} + t_{22} + \ldots + t_{2j} \quad (39)$$

wherein i represents the number of the parallel plane plates in the color synthesizing optical system, and j represents the number of the parallel plane planes disposed to compensate for the astigmatism generated in the color synthesizing optical system. It is assumed that two parallel plane plates are passed through when reflection takes place once in the case of rear reflection.

In the embodiment shown in FIG. 12, j is 1 for all the optical paths from the reflecting light valves 121, 122, 123. However, i is 2 for the optical path from the reflecting light valve 121, 3 for the optical path from the reflecting light valve 122, and 2 for the optical path from the reflecting light valve 123.

In the embodiment shown in FIG. 12, the color synthesizing optical system is formed when light beams pass through a plurality of parallel plane plates and when rear reflection is conducted in the same conditions as those for two times of transmission. The concept of astigmatism compensation and the formula (35) used as the basic formula for compensation conditions are applicable as they are to this embodiment.

Although reflecting light valves which use liquid crystal layers to modulate the polarization conditions of light beams to be read depending on images written in the photoconductive layers are used as light valves in the above-mentioned embodiments, other liquid crystal panels, electrooptic crystals, or the like can be used as light valves, provided that they are a reflection type which forms optical images represented as changes in double refraction.

Furthermore, all the concepts and methods for astigmatism compensation, such as those implemented by transmitting light valves and those implemented by scattering/diffracting/deflecting light valves, are applicable to the present invention, provided that they form optical images as changes in optical characteristics.

A still another embodiment of a projection apparatus implemented by using transmitting light valves is described below referring to FIG. 13.

Transmitting light valves 150, 151, 152 each comprise a TFT liquid crystal cell, which uses a twist nematic liquid crystal as an optical modulation material, and polarizing plates used as a polarizer and an analyzer and disposed before and after the TFT liquid crystal cell.

Light from a light source 141 enters a UV-IR cut filter 142 which absorbs or reflects ultraviolet and infrared rays an d allow s only the visible light to pass through. The visible light is reflected by a plane mirror 143 and separated into three primary color light components: red, green and blue by a color separating optical system comprising dichroic mirrors 144, 145 and a plane mirror 146 The three primary color light components sequentially enter field lenses 147, 148, 149, and transmitting light valves 150, 151, 152.

The color synthesizing optical system of the present embodiment comprises a plane mirror 153 and dichroic mirrors 154, 155. The projection lens of the embodiment comprises a second lens group comprising lenses 156, 157 and a first lens group 158 having positive power. The reflecting plane of the plane mirror 153 and the color synthesizing planes of the dichroic mirrors 154, 155 are inclined 45° with respect to the optical axis of the projection lens.

The outgoing light beams from the light valves 150, 151, 152 are synthesized to a single light beam by the color synthesizing optical system, and the image of the light beam is magnified and projected on a screen by the projection lens.

As described above, the reflection planes of the plane mirror 153 and the dichroic mirrors 154, 155 constituting the color synthesizing optical system are required to have high plane accuracy, and the plane accuracy significantly depends on the thickness of the substrate. In particular, as the reflection plane is closer to the principal point of the projection lens, the plane accuracy exerts more significant effect on the resolution of the projected image. In other words, the reflection plane of the dichroic mirror 155 is required to have higher plane accuracy than the reflection plane of the plane mirror 153 and the dichroic mirror 154.

Figure 13:
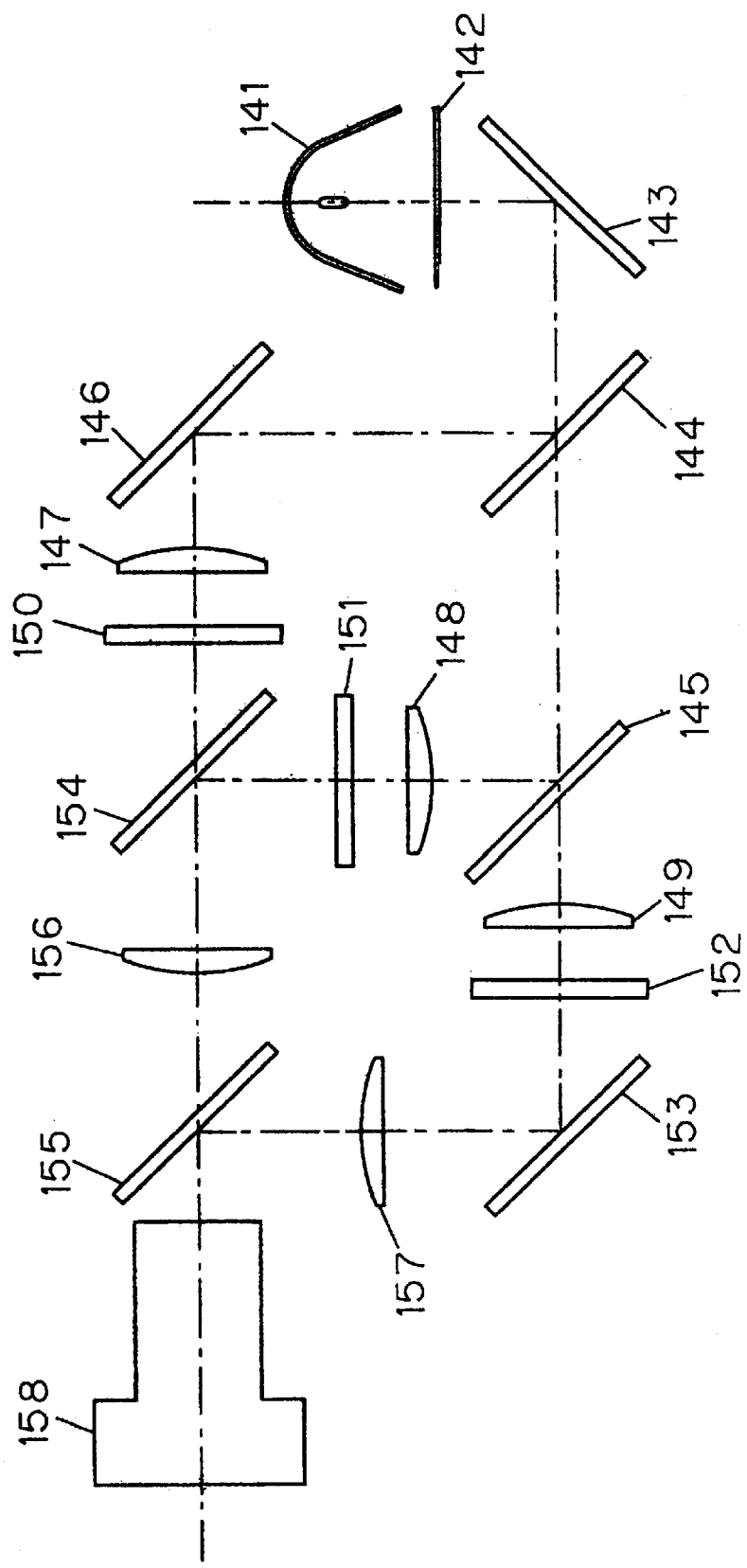
FIG. 13 is a schematic view showing the structure of an optical apparatus in accordance with still another embodiment of the invention.

In the structure shown in FIG. 13, the lenses 156, 157 of the second lens group located away from the first lens group 158 are disposed between the dichroic mirrors 154 and 155 and between the plane mirror 153 and the dichroic mirror 155, respectively. With this structure, as can be understood from the formula (31), the astigmatic difference generated at the dichroic mirror 155 viewed from the light valves 150, 151, 152 can be made smaller by the square of the virtual image magnification obtained by the second lens group having positive power than the astigmatic difference generated without the lens 156 of the second lens group. Therefore, the substrate of the dichroic mirror 155 can be made thicker than the substrate thereof in case the lens 156 is not used. Consequently, the plane accuracy of the reflection plane of the dichroic mirror 155 can be made high without increasing astigmatism.

In the embodiment shown in FIG. 13, the astigmatism generated at the color synthesizing optical system is not completely compensated for on the optical axis of the projecting optical system. However, the concept of astigmatism in the optical apparatus of the invention is the same as the concept of the present embodiment. The effect of using the lens 156 of the second lens group is significant.

In the optical path passing through the lens 157 of the second lens group, since light from the light valve 152 is only reflected by the plane mirror 153 and the dichroic mirror 155, astigmatism is not caused. Therefore, the lens 157 of the second lens group does not contribute to the reduction of astigmatism. However, since the first lens group 158 and the second lens group 156, 157 constitute a lens system having image forming capability, the lens 157 of the second lens group is necessary to form images.

In the structure shown in FIG. 13, astigmatism may also be compensated for by providing a space for accommodating a transparent plate, wherein the plane including the normal line of the parallel plane and the optical axis of the projection lens is perpendicular to the plane including the normal line of the color synthesizing planes of the dichroic mirrors 154, 155 and the optical axis of the projection lens, between the light valves 150, 151, 152 and the first lens group 158.

Although the transmitting light valves are used in the embodiment shown in FIG. 13, the same effect can be obtained even when reflecting light valves are used, provided that a projecting optical system having a color synthesizing optical system is used.

As described above, in the present invention, the astigmatism generated at the color synthesizing optical system can be properly compensated for, and the projecting optical system can be made compact. Therefore, by using the optical apparatus of the present invention for a projection display apparatus, projected images having very high resolution can be displayed even when the projecting optical system has a color synthesizing optical system and comprises a single projection lens, thereby delivering significant effect.

Although the projection display apparatus using three light valves for red, green and blue light components to obtain full-color projected images and the optical compensation method applicable to such an apparatus have been explained in the description of the above-mentioned embodiment, other apparatuses such as an optical apparatus for forming and delivering monochromatic optical images, and optical compensation methods for such optical apparatuses may also be used.

Furthermore, the descriptions of the above-mentioned embodiment include the explanations of a projection display apparatus equipped with the second lens group as the second lens means of the invention, also equipped with the polarizing and splitting mirrors as the transparent substrate of the polarizing and splitting means of the invention, explaining that the apparatus is used to reduce astigmatism generated at the dichroic mirrors or the like of the color synthesizing optical system used as the plane plate members of the invention (or the apparatus is used to increase the plane accuracy of the dichroic mirrors without increasing astigmatism) and also explaining that the apparatus performs compensation to cancel astigmatism. The descriptions also include the optical compensation method applicable to such an apparatus. However, an apparatus not equipped with the transparent substrate of the polarizing and splitting means, but equipped with the second lens means, and the optical compensation method applicable to such an apparatus may also be used. In this case, as understood from the formula (31), the effect of reducing the astigmatism generated at the transparent plate 67 and the dichroic mirrors 68, 69 of the color synthesizing optical system shown in FIG. 5 for example by the square of the virtual image magnification m of the second lens group (64, 65, 66) can be obtained. Alternatively, as another effect, the substrates of the dichroic mirrors can be made thicker more significantly without increasing astigmatism than those in the case of the structure without the second lens group, whereby the reflection planes of the dichroic mirrors can have higher plane accuracy.

Moreover, it is explained that the polarizing and splitting means of the invention is equipped with a transparent substrate having a predetermined thickness and covered with a film having a polarizing and selecting characteristic. However, the polarizing and splitting means is not limited to such a structure. A polarizing and splitting means provided with a thin film having a polarizing and selecting characteristic, both ends of which are held with prism-shaped members, may also be used as a matter of course. Even in this case, the astigmatism generated at the transparent plate 67, the dichroic mirrors 68, 69 of the color synthesizing optical system shown in FIG. 5 for example can be reduced by the square of the virtual image magnification m of the second lens group (64, 65, 66).

What is claimed is:

1. An optical apparatus comprising:

image forming means for forming optical images;

second lens means for transmitting light from said image forming means;

plane plate members for transmitting or reflecting light from said second lens means; and first lens means for receiving light from said plane plate members and delivering processed light, wherein said plane plate members are disposed obliquely with respect to an optical axis of said first lens means, and the magnitude of the astigmatism generated depending on said plane plate members is smaller than the magnitude generated when said second lens means are not used, said magnitude of astigmatism being determined based on a virtual image magnification of said second lens means.

2. An optical apparatus according to claim 1, further comprising polarizing and splitting means disposed between said image forming means and said second lens means and having a polarizing and selecting characteristic so as to reflect a first polarized light component and transmit a second polarized light component, said first polarized light component being perpendicular to said second polarized light component, wherein said image forming means are reflecting means for modulating a polarization direction of light, and said first polarized light component of the light from a light source is reflected by said polarizing and splitting means, the reflected first polarized light component enters said image forming means, the entering first polarized light component is modulated according to said second polarized light component depending on a predetermined image light or predetermined image signal by said image forming means, the modulated light reenters said polarizing and splitting means, and the second polarized light component of the incident light is transmitted by said polarizing and splitting means.

3. An optical apparatus according to claim 2, wherein said polarizing and splitting means are equipped with a thin film having said polarizing and selecting characteristic, and both sides of the thin film are held by prism-shaped members.

4. An optical apparatus according to claim 2, wherein said polarizing and splitting means are equipped with a transparent substrate having a predetermined thickness, and a film with said polarizing and selecting characteristic, said plate and said film being obliquely disposed with respect to the optical axis of said first lens means, wherein a plane including a normal line to said transmitting or reflecting plane of one of said plane plate members and an optical axis of the second lens means is perpendicular to a plane including a normal line to said film-formed plane of said transparent substrate and an optical axis of said first or second lens means.

5. An optical apparatus according to claim 1, wherein said image forming means are transmitting means for forming said optical images by receiving incident light from a light source and by controlling transmitted light during the transmission of the light depending on image signals.

6. An optical apparatus comprising:

image forming means for forming optical images;

polarizing and splitting means having a polarizing and selecting characteristic so as to reflect a first polarized light component and transmit a second polarized light component, a first and second polarized light components being perpendicular to each other;

plane plate members for transmitting and/or reflecting light; and a lens means for receiving light from said plane plate members and delivering processed light, in this sequence, wherein said plane plate members are disposed obliquely with respect to an optical axis of said lens means, said polarizing and splitting means are equipped with a transparent substrate having a predetermined thickness and a film with said polarizing and selecting characteristic, and are disposed obliquely with respect to the optical axis of said lens means, the plane including a normal line to said transmitting or reflecting plane of said plane plate members and an optical axis of said lens means is perpendicular to a plane including a normal line to said film-formed plane of said transparent substrate and the optical axis of said lens means.

7. An optical apparatus according to claim 6, wherein said image forming means are reflecting means for modulating a polarization direction of light, and said first polarized light component of the light from a light source is reflected by said polarizing and splitting means, the reflected first polarized light component enters said image forming means, the entering first polarized light component is modulated according to said second polarized light component depending on predetermined image light on a predetermined image signal by said image forming means, the modulated light reenters said polarizing and splitting means, and the second polarized light component of the incident light is transmitted by said polarizing and splitting means.

8. An optical apparatus according to claim 4, wherein a relationship between a thickness of said transparent substrate and a thickness of said plane plate member is adjusted so that an astigmatism generated depending on said transparent substrate and an astigmatism generated depending on said plane plate members are substantially canceled by each other.

9. An optical apparatus according to claim 8, wherein the relationship between a thickness $t_1$ of a transparent substrate used as said plane plate member and a thickness $t_2$ of a transparent substrate of said polarizing and splitting means satisfy the following condition:

$$\frac{t_2}{t_1} = \frac{(n_1^2 - n_1'^2)\sin^2\theta_1}{(n_2^2 - n_2'^2)\sin^2\theta_2} \left( \frac{n_2^2 - n_2'^2\sin^2\theta_2}{n_1^2 - n_1'^2\sin^2\theta_1} \right)^{3/2}$$

wherein $n_1$ is a refractive index of said plane plate members, $n_1'$ is a refractive index of a medium of said plane plate member, $\theta_1$ is an incident angle of an incident light beam on an optical axis of said lens means, entering from said medium to said plane plate member, $n_2$ is a refractive index of the transparent substrate of said polarizing and splitting means, $n_2'$ is a refractive index of said polarizing and splitting means, $\theta_2$ is an incident angle of an incident light beam on the optical axis of said lens means, entering from said medium to said polarizing and splitting means.

10. An optical apparatus according to claim 9, wherein said plate thickness $t_1$ and said plate thickness $t_2$ are represented by the following formulas when a plurality of transparent substrates are used for said plane plate members and/or said polarizing and splitting:

$$t_1 = t_{11} + t_{12} + \ldots + t_{1i}$$

$$t_2 = t_{21} + t_{22} + \ldots + t_{2j}$$

wherein $t_{1i}$ (i=1, 2, 3, ...) represents a thickness of the ith plane plate member of the plural plane plate members, and $t_{2j}$ (j=1, 2, 3, ...) represents a thickness of the jth transparent substrate of the plural transparent substrates.

11. An optical compensation method for an optical apparatus comprising:

image forming means for forming optical images;

second lens means for transmitting light from said image forming means;

plane plate members for transmitting or reflecting light from said second lens means; and first lens means for receiving light from said plane plate members and delivering processed light, said plane plate members being disposed obliquely with respect to an optical axis of said first lens means, wherein said first lens means receives light from said plane plate members and projects said optical images, said second lens means is disposed between said plane plate members and said image forming means, and a virtual image magnification of said second lens is adjusted so that a magnitude of an astigmatism generated depending on said plane plate members is smaller than the magnitude generated when said second lens means are not used.

12. An optical compensation method for an optical apparatus comprising:

image forming means for forming optical images;

polarizing and splitting means having a predetermined thickness and transmitting or reflecting light depending on the polarized light component, plane plate members having a predetermined thickness and transmitting and reflecting light, a lens means for receiving light from said plane plate members and delivering processed light, in this sequence, a plane plate member being disposed obliquely with respect to an optical axis of said lens means, wherein a plane including a normal line to said plane plate members and the optical axis of said lens means is perpendicular to a plane including a normal line to said polarizing and splitting means and the optical axis of said lens means, a relationship between a thickness of said plane plate member and a thickness of said transparent substrate is adjusted so that an astigmatism generated at said plane plate member and an astigmatism generated at said polarizing and splitting means can be compensated for with each other.

13. An optical apparatus comprising:

a plurality of image forming means for forming optical images depending on the change in double refraction;

polarizing and splitting means provided at each of said image forming means and for splitting polarized light components whose polarized wave planes are perpendicular to each other;

second lens provided at each of said polarizing and splitting means and for transmitting light from the polarizing and splitting means;

color synthesizing means for synthesizing light beams from each one of said polarizing and splitting means into a single light beam; and the first lens for receiving light from said color synthesizing means and delivering processed light, in this sequence, wherein said polarizing and splitting means have a transparent substrate having parallel planes disposed obliquely with respect to an optical axis of said first lens, and a dielectric multilayer film having a polarizing and selecting characteristic formed on the transparent substrate, said color synthesizing means comprise a plurality of dichroic mirrors which are respectively made by forming a dielectric multilayer film having a wavelength selection characteristic on a transparent substrate having parallel planes and disposed obliquely with respect to the optical axis of said first lens, a plane including a normal line of a dielectric multilayer film formation plane of each one of said dichroic mirrors and an optical axes of said first and second lens is perpendicular to a plane including a normal line of a dielectric multilayer formation plane of said polarizing and splitting means and the optic al axes of said first and second lens.

14. An optical apparatus according to claim 13, wherein a thickness $t_1$ of said transparent substrate s of a single or a plurality of said dichroic mirrors and a thickness $t_2$ of said transparent substrate of said polarizing and splitting means satisfy the following condition:

$$\frac{t_2}{t_1} = \frac{m_s^2(n_1^2 - n_1'^2)\sin^2\theta_1}{(n_2^2 - n_2'^2)\sin^2\theta_2} \left( \frac{n_2^2 - n_2'^2\sin^2\theta_2}{n_1^2 - n_1'^2\sin^2\theta_1} \right)^{3/2}$$

wherein $m_S$ is a virtual image magnification at a sagittal paraxial image point of said second lens, $n_1$ is a refractive index of the transparent substrate of each one of said dichroic mirrors, $n_1'$ is a refractive index of a medium of said dichroic mirrors, $\theta_1$ is an incident angle of a light beam on the optical axis of said first or second lens and entering from said medium to each one of said dichroic mirrors, $n_2$ is a refractive index of the transparent substrate of said polarizing and splitting means, $n_2'$ is a refractive index of the medium of said polarizing and splitting means, $\theta_2$ is an incident angle of a light on the optical axis of said first or second lens and entering from said medium to a polarizing and splitting plane of said polarizing and splitting means.

15. An optical apparatus according to claim 14, wherein the thickness of said transparent substrates of said dichroic mirrors is in a range of 1.5 mm or more to 3.0 mm or less.

16. An optical apparatus according to claim 13, wherein said polarizing and splitting means are made by closely contacting both planes of said transparent substrate with a liquid or solid having a refractive index different from a refractive index of the transparent substrate on which a dielectric multilayer film having said polarizing and selecting characteristic is formed so as to have a prism shape as a whole.

17. An optical apparatus according to claim 13, wherein said color synthesizing means comprise said two dichroic mirrors, an optical compensation plate and a plane mirror, and planes of said two dichroic mirrors, said optical compensation plate and said plane mirror are parallel with one another.

18. An optical apparatus according to claim 17, wherein the thickness of said two dichroic mirrors is equal to the thickness of said optical compensation plate.

19. A projection display apparatus comprising:
a light source delivering light including the three primary color components;
color separating means for separating the light from said light source into the three primary color components;
three prepolarizers for receiving each one of three output light beams from said color separating means, respectively;
a polarized beam splitter, disposed at each of said prepolarizers, respectively, for transmitting or reflecting light beams from said prepolarizer;
a reflecting light valve, disposed at each of said polarized beam splitters, respectively, for forming optical images on the basis of light beams from a predetermined image source and an optical writing means;
color synthesizing means for synthesizing light beams from said polarization beam splitters into a single light beam;
a second lens disposed between said polarized beam splitter and said color synthesizing means so as to correspond to said polarized beam splitter; and
a first lens for receiving light from said color synthesizing means and delivering processed light, wherein
said image source generates image light beams to be applied so as to correspond to said reflecting light valve,
said light writing means forms the images of said image light beams from said image source on said reflecting light valve,
each one of said polarization beam splitters have a polarizing and splitting mirror with a dielectric multilayer film having a polarizing and selecting characteristic formed on the transparent substrate thereof, said each one of said polarizing light beam splitters is disposed between said reflecting light valve and said second lens,
said color synthesizing means comprise two dichroic mirrors, an optical compensation plate, both planes of which are subjected to reflection prevention treatment, and a plane mirror, and said color synthesizing means is disposed between said first lens and said second lens,
a polarizing and splitting plane of said polarizing and splitting mirror, color synthesizing planes of said two dichroic mirrors and a reflection prevention plane of said optical compensation plate are disposed obliquely with respect to an optical axis of said first lens, respectively, and
a plane including a normal line of the polarizing and splitting plane of said polarizing and splitting mirror and an optical axis of said first lens and said second lens is perpendicular to a plane including a normal line of the color synthesizing plane of said two dichroic mirrors, a normal line of the reflection prevention plane of said optical compensation plates and the optical axis of said first lens and said second lens.

20. A projection display apparatus according to claim 19, wherein the thickness of said two dichroic mirrors is equal to the thickness of said optical compensation plate.

21. A projection display apparatus according to claim 19, wherein an each thickness ti of said two dichroic mirrors and said optical compensation plate and a thickness t2 of said transparent substrate for forming said polarizing and splitting plane of said polarization beam splitter satisfy the following conditions:

$$\frac{t_2}{t_1} = \frac{m_s^2(n_1^2 - n_1'^2)\sin^2\theta_1}{(n_2^2 - n_2'^2)\sin^2\theta_2} \left(\frac{n_2^2 - n_2'^2\sin^2\theta_2}{n_1^2 - n_1'^2\sin^2\theta_1}\right)^{3/2}$$

wherein $m_S$ is a virtual image magnification at a sagittal paraxial image point of said second lens, $n_1$ is a refractive index of substrates of said two dichroic mirrors and said optical compensation plate, $n_1'$ is a refractive index of a medium of said two dichroic mirrors and said optical compensation plate, $\theta_1$ is an incident angle of a light beam on an optical axis of said first or second lens and entering from said medium to said two dichroic mirrors and said optical compensation plate, $n_2$ is a refractive index of the transparent substrate of said polarizing and splitting mirror, $n_2'$ is a refractive index of the medium of the polarizing and splitting mirror of said polarization beam splitter, and $\theta_2$ is an incident angle of a light beam on an optical axis of said first or second lens and entering from said medium to the polarizing and splitting plane of said polarizing and splitting mirror.

22. A projection display apparatus according to claim 21, wherein the thickness of said two dichroic mirrors and the thickness of said optical compensation plate are in the range of 1.5 mm or more to 3.0 mm or less, respectively.

23. A projection display apparatus according to claim 19, wherein each one of said polarization beam splitters has a frame, a plurality of transparent substrates used as incident and outgoing light windows, and a polarizing and splitting mirror having a polarizing and splitting plane, respectively, and
said polarization beam splitter is a transparent prism-shaped member wherein a transparent liquid is filled in a container comprising said frame, a plurality of said transparent substrates and said polarizing and splitting mirror.

24. A projection display apparatus according to claim 23, wherein main ingredient of said transparent liquid is ethylene glycol.

25. A projection display apparatus according to claim 23, wherein a refractive index of said transparent substrate of said polarizing and splitting mirror on which the polarizing and splitting plane is formed differs from a refractive index of said transparent liquid.

26. A projection display apparatus according to claim 19, wherein the polarizing and splitting planes of the polarizing and splitting mirrors of said three polarization beam splitters are parallel with one another.

27. A projection display apparatus comprising:
a light source delivering light including three primary color components;
color separating means for separating the light from said light source into the three primary color components;
three light valves for respectively receiving one of each of the output light beams from said color separating means, respectively;
color synthesizing means for synthesizing output light beams from said light valves into a single light beam;
a second lens disposed between said light valves and said color synthesizing means; and
a first lens for receiving light from said color synthesizing means and delivering processed light, wherein
said color synthesizing means comprise a first dichroic mirror, a second dichroic mirror, and a plane mirror, and said
second lens is disposed between said first dichroic mirror and said second dichroic mirror, and a virtual image magnification of said second lens is adjusted so that a magnitude of an astigmatism generated depending on said second dichroic mirror is smaller than the magnitude generated when said second lens is not used.

28. An optical apparatus according to claim 7, wherein a relationship between a thickness of said transparent substrate and a thickness of said plane plate member is adjusted so that an astigmatism generated depending on said transparent substrate and an astigmatism generated depending on said plane plate members are substantially canceled with each other.

* * * * *